(12) United States Patent
Matsuda et al.

(10) Patent No.: US 11,345,397 B2
(45) Date of Patent: May 31, 2022

(54) DRIVING DEVICE AND ELECTRIC POWER STEERING APPARATUS USING THE SAME

(71) Applicant: DENSO CORPORATION, Kariya (JP)

(72) Inventors: Kunihiko Matsuda, Kariya (JP); Katsuhiko Hayashi, Kariya (JP); Takaharu Kozawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 386 days.

(21) Appl. No.: 16/668,321

(22) Filed: Oct. 30, 2019

(65) Prior Publication Data
US 2020/0140004 A1    May 7, 2020

(30) Foreign Application Priority Data
Nov. 2, 2018 (JP) .............................. JP2018-207417

(51) Int. Cl.
    *B62D 5/04* (2006.01)

(52) U.S. Cl.
    CPC ......... *B62D 5/0463* (2013.01); *B62D 5/0412* (2013.01)

(58) Field of Classification Search
    CPC .... B62D 5/0463; B62D 5/0412; B62D 5/046; B62D 5/0409
    See application file for complete search history.

(56) References Cited

U.S. PATENT DOCUMENTS

| | | | | |
|---|---|---|---|---|
| 8,415,845 B2 * | 4/2013 | Miyachi | ................. | H02K 3/522 310/71 |
| 8,569,981 B2 * | 10/2013 | Nakamura | ........... | B62D 5/0484 318/400.02 |
| 9,698,711 B2 * | 7/2017 | Hayashi | ............... | B62D 5/0403 |
| 2004/0264075 A1 * | 12/2004 | Kolomeitsev | ........ | B62D 5/0487 361/23 |
| 2011/0156623 A1 * | 6/2011 | Nakamura | .............. | H02P 21/06 318/400.02 |
| 2012/0031697 A1 | 2/2012 | Matsuda | | |
| 2012/0049782 A1 * | 3/2012 | Suzuki | .................... | H02P 25/22 318/807 |
| 2012/0286594 A1 | 11/2012 | Miyaki et al. | | |
| 2013/0033210 A1 * | 2/2013 | Suzuki | ................. | B62D 5/0403 318/400.22 |
| 2013/0200827 A1 * | 8/2013 | Kezobo | ............... | H02P 29/0241 318/400.21 |
| 2016/0036289 A1 | 2/2016 | Kawata et al. | | |
| 2017/0217481 A1 | 8/2017 | Asao et al. | | |

(Continued)

FOREIGN PATENT DOCUMENTS

| | | |
|---|---|---|
| JP | 2012-039737 A | 2/2012 |
| JP | 2013-219919 A | 10/2013 |

(Continued)

*Primary Examiner* — Tony H Winner
*Assistant Examiner* — Michael R Stabley
(74) *Attorney, Agent, or Firm* — Maschoff Brennan

(57) ABSTRACT

Switching elements are mounted on a substrate and switch energization of motor windings. A lead wire set connects phase coils of the motor windings to the substrate. The switching elements, the lead wire set, a power terminal which is a power supply terminal and a ground terminal, and a control circuit unit are provided for each system. The switching elements, the lead wire set and the power terminal are collectively arranged in a power region for each system, and the lead wire sets are arranged in rotational symmetry.

10 Claims, 18 Drawing Sheets

(56) References Cited

U.S. PATENT DOCUMENTS

2018/0201302 A1 7/2018 Sonoda et al.
2019/0126973 A1 5/2019 Yamasaki

FOREIGN PATENT DOCUMENTS

| JP | 2016-36244 A | 3/2016 |
| JP | 2017-163774 A | 9/2017 |
| JP | 6223593 B2 | 11/2017 |

* cited by examiner

DRIVING DEVICE AND ELECTRIC POWER STEERING APPARATUS USING THE SAME

CROSS REFERENCE TO RELATED APPLICATION

The present application is based on Japanese Patent Application No. 2018-207417 filed on Nov. 2, 2018, the whole disclosures of which are incorporated herein by reference.

FIELD

The present disclosure relates to a driving device and an electric power steering apparatus using the same.

BACKGROUND

A conventional driving device includes a motor and an inverter circuit, which controls driving of the motor. For example, a motor wire of each phase is arranged point-symmetrically with respect to an axial center.

SUMMARY

A driving device according to the present disclosure comprises a rotary electric machine, a substrate, a magnetic detection element, switching elements, a lead wire set, a power supply terminal, a ground terminal and a control circuit unit. The rotary electric machine includes motor windings of "n" systems ("n" is integer equal to or larger than 2). The substrate is provided on one end side in an axial direction of the rotary electrical machine. The magnetic detection element is mounted on the substrate for detecting a rotating magnetic field of a detection target which rotates integrally with the shaft. The switching elements are mounted on the substrate for switching energization of the motor windings. The lead wire set connects the substrate and each phase winding of the motor windings. The power supply terminal connects the substrate and a power supply. The ground terminal connects the substrate and a ground. The control circuit unit is used to control on-off operations of the switching elements.

DETAILED DESCRIPTION OF THE EMBODIMENT

Figure 1:
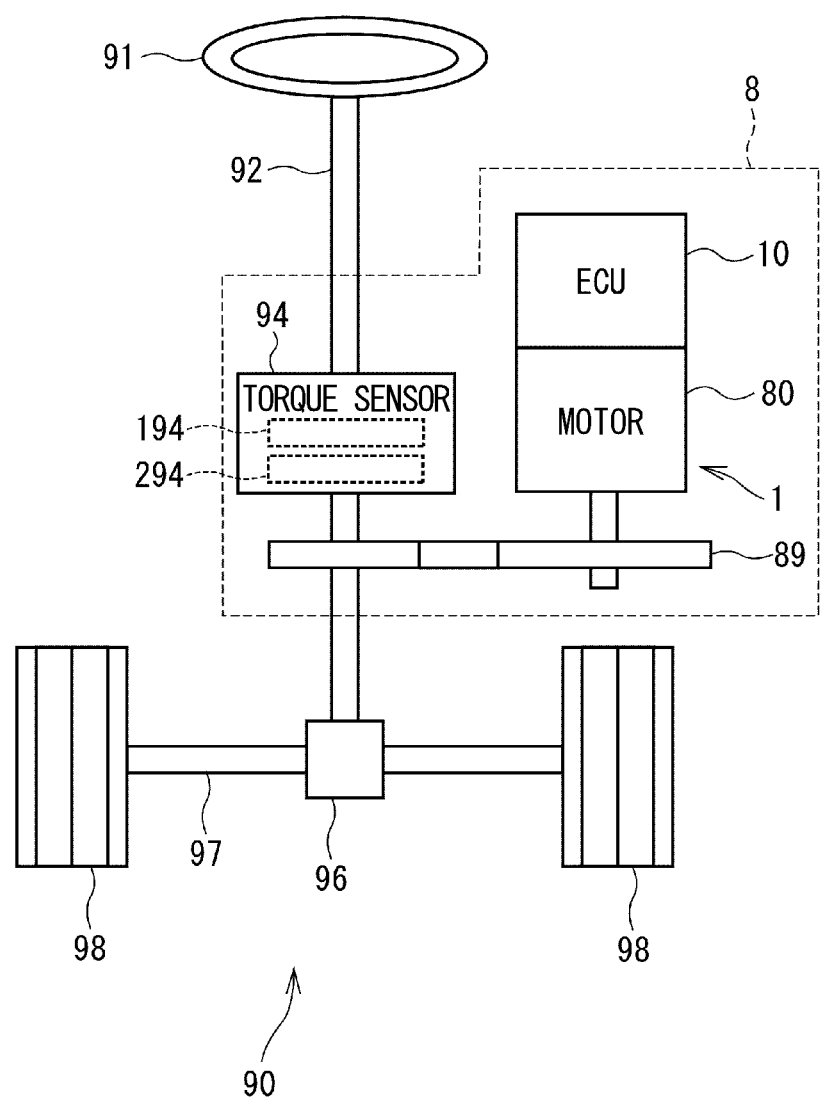
FIG. 1 is a schematic structural diagram showing a steering system including a driving device according to a first embodiment.

A driving device and an electric power steering apparatus using the driving device according to the present disclosure will be described with reference to plural embodiments shown in the accompanying drawings. In the following embodiments, substantially same structural configurations are designated with the same reference numerals thereby to simplify the description.

First Embodiment

As shown in FIG. 1, a driving device 1 according to a first embodiment includes a motor 80 and an electronic control unit (ECU) 10, and is applied to an electric power steering apparatus 8, which assists a steering operation of a vehicle. FIG. 1 shows an overall configuration of a steering system 90 including the electric power steering apparatus 8. The steering system 90 includes a steering wheel 91 which is a steering member, a steering shaft 92, a pinion gear 96, a rack shaft 97, road wheels 98 and the electric power steering apparatus 8.

Figure 3:
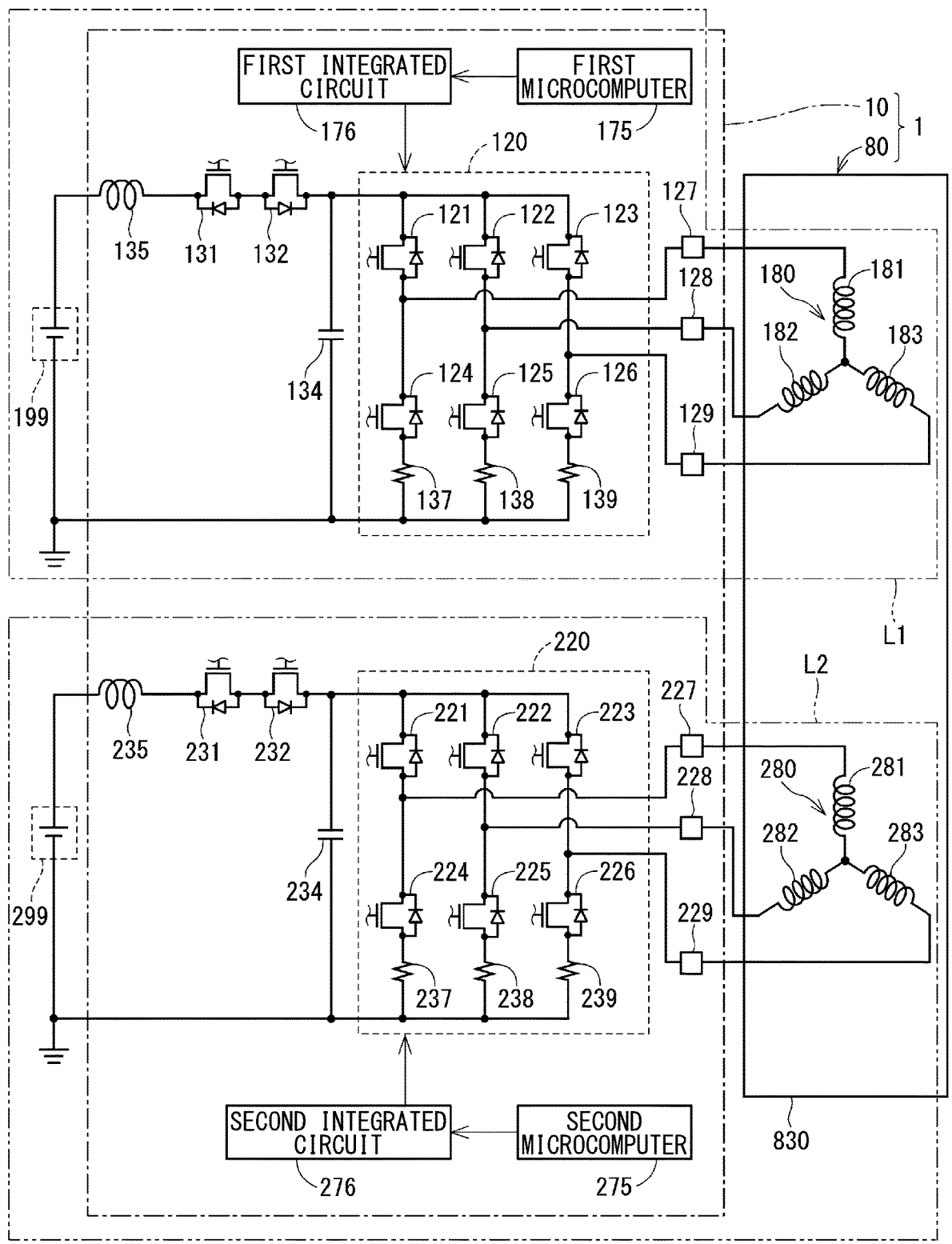
FIG. 3 is a circuit diagram showing the driving device according to the first embodiment.

The steering wheel 91 is connected to the steering shaft 92. A torque sensor 94 is provided on the steering shaft 92 to detect a steering torque. The torque sensor 94 has two torque detection units 194 and 294 provided for two systems, respectively, as described later. Detection values of the torque detection units 194 and 294 are output to corresponding microcomputers 175 and 275 in the ECU 10 as shown in FIG. 3 and described later. A pinion gear 96 is provided at an axial end of the steering shaft 92. The pinion gear 96 meshes with a rack shaft 97. A pair of road wheels 98 is coupled to both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of road wheels 98 is steered to an angle corresponding to a displacement amount of the rack shaft 97.

The electric power steering apparatus 8 includes the driving device 1, a reduction gear 89 or the like as a power transmission mechanism that reduces rotation of the motor 80 and transmits the rotation to the steering shaft 92. The electric power steering apparatus 8 of the present embodiment is a column assist type, and the steering shaft 92 is a driving target. Alternatively, the electric power steering apparatus may be a rack assist type which transmits the rotation of the motor 80 to the rack shaft 97.

Figure 2:
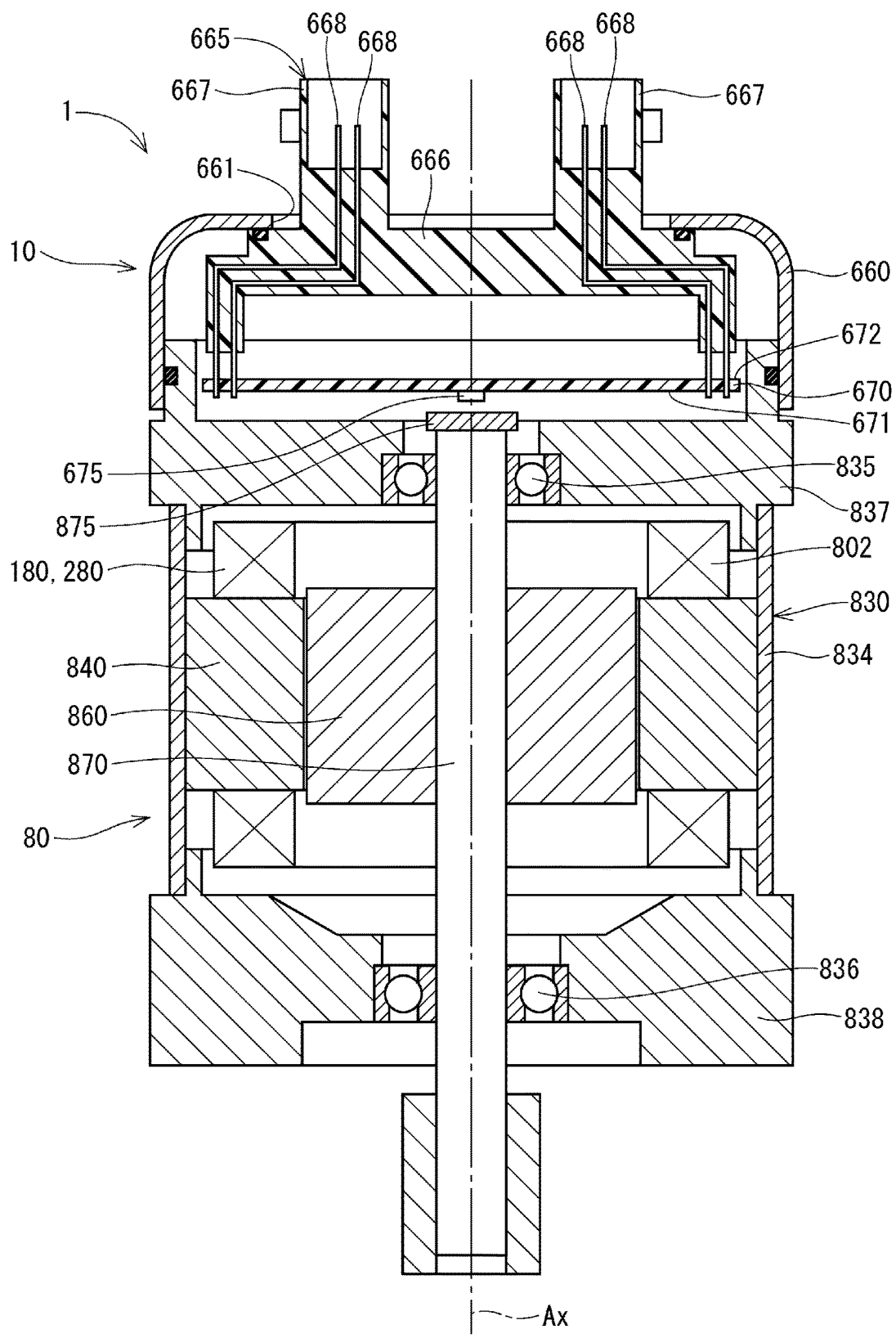
FIG. 2 is a cross-sectional view showing the driving device according to the first embodiment.

As shown in FIGS. 2 and 3, the motor 80 is a three-phase brushless motor. The motor 80 outputs a whole or a part of an assist torque required for a steering operation. The motor 80 is driven with electric power supplied from batteries 199 and 299 (see FIG. 3) to rotate the reduction gear 89 in forward and reverse directions.

The motor 80 has a first motor winding 180 and a second motor winding 280 as two winding sets corresponding to two systems described later. The motor windings 180 and 280 have the same electrical characteristics and are wound about a stator 840 with their electrical angles shifted from each other by 30 degrees. Correspondingly, phase currents are controlled to be supplied to the motor windings 180 and 280 such that the phase currents have a phase difference φ of 30 degrees. By optimizing a current supply phase difference, the output torque is improved. It is also possible to reduce a sixth-order torque ripple. Furthermore, it is possible to maximize advantages of cancellation of noise and vibration since the current is averaged by the current supply with phase difference. Heat generation is also averaged. Therefore, it is also possible to reduce temperature-dependent errors in the detection values of each sensor or torque between the systems, and it is possible to average a current amount capable of energization.

Hereinafter, a combination of configurations related to the energization control of the first motor winding 180 will be referred to as a first system of the two systems, and a combination of configurations related to the energization control of the second motor winding 280 will be referred to as a second system of the two systems. The configuration of the first system is generally numbered as reference numerals in 100s, the configuration of the second system is generally numbered as reference numerals in 200s, and lower 2 digits of the reference numerals are substantially the same for the first and second systems. With this numbering of reference numerals, the description will be simplified. An index of "1" is added to a component or a value related to the first system, and an index of "2" is added to a component or a value related to the second system. In addition, "first" and "second" attached to structural member names and the like indicating respective systems are omitted for simplicity.

As shown in FIG. 2, in the driving device 1, the ECU 10 is integrally provided on one side in the axial direction of the motor 80 and is a machine-electronics integrated type. The ECU 10 is positioned coaxially with an axis Ax of the shaft 870 on the side opposite to the output shaft of the motor 80. The ECU 10 may alternatively be provided on the output shaft side of the motor 80. By adopting the machine-electronics integrated type, it is possible to efficiently position the ECU 10 and the motor 80 in a vehicle having restriction for mounting space. Hereinafter, the terms "axial direction" and "radial direction" will mean the axial direction and the radial direction of the motor 80.

The motor 80 includes a stator 840, a rotor 860 and a housing 830 which houses the stator 840 and the rotor 860 therein. The stator 840 is fixed to the housing 830 and the motor windings 180 and 280 are wound thereon. The rotor 860 is provided radially inside the stator 840 to be rotatable relative to the stator 840.

The shaft 870 is fitted in the rotor 860 to rotate integrally with the rotor 860. The shaft 870 is rotatably supported by the housing 830 by bearings 835 and 836. Axial end portion of the shaft 870 on the ECU 10 side protrudes from the housing 830 toward the ECU 10. A magnet 875 is provided at the axial end of the shaft 870 on the ECU 10 side.

The housing 830 has a cylindrical case 834 and a rear end frame 837 and a front end frame 838. The rear end frame 837 is provided to close an opening of the case 834 on the ECU 10 side. The front end frame 838 is provided to close an opening on the output end side of the case 834. The rear end frame 837 and the front end frame 838 are fastened by, for example, through bolts (not shown) while sandwiching the case 834.

The rear end frame 837 is formed with lead wire insertion holes (not shown) into which the lead wire sets 170 and 270 (see FIG. 4) connected to the respective phases of the motor windings 180 and 280 are inserted. The lead wire sets 170 and 270 are taken out from the lead wire insertion holes to the ECU 10 side and connected to a substrate 670 of the ECU 10.

The ECU 10 includes a cover 660, a connector 665, the substrate 670 and various electronic components mounted on the substrate 670. The cover 660 is formed in a substantially bottomed cylindrical shape, and fits on the radially outer peripheral side of the rear end frame 837. The cover 660 is provided to cover the substrate 670, and protects the electronic components from external impact or prevents the infiltration of dust and water into the inside of the ECU 10. An opening 661 is formed at a bottom of the cover 660.

Figure 4:
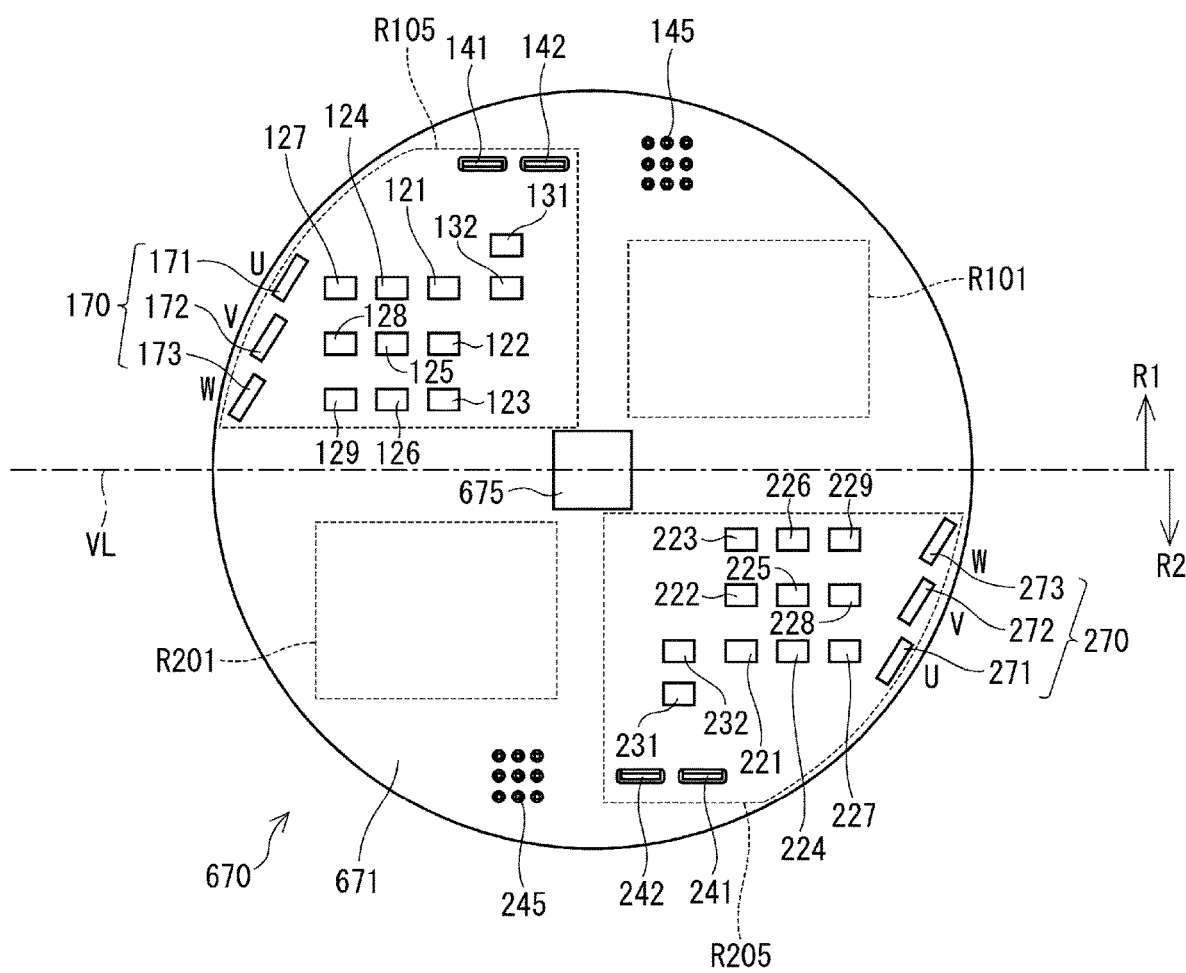
FIG. 4 is a plan view showing a motor surface side of a substrate in the first embodiment.

The connector 665 has a base portion 666 and a connector portion 667. The base portion 666 is fixed to the rear end frame 837 by bolts or the like (not shown). The connector portion 667 is formed to protrude from the base portion 666, and is taken out from the opening 661 of the cover 660 in the axial direction. The front end of the connector portion 667 is opened in the axial direction, and provided to enable a harness (not shown) to be inserted and removed from the side opposite to the motor 80. The connector portion 667 is provided with connector terminals 668. The connector terminals 668 are embedded in the connector 665. One ends of the terminals 668 are exposed to the substrate 670 side to be connected to the substrate 670. The other ends of the terminals 668 are exposed to the internal space of the connector portion 667. The connector terminals 668 include, as described later, power terminals 141 and 241, ground terminals 142 and 242, and control terminals 145 and 245 as shown in FIG. 4. Although FIG. 2 illustrates an example in which the connector portion 667 is divided into two, the number of connector portions 667, the number of terminals, and the like are determined arbitrarily. Further, the base portion 666 and the connector portions 667 may be separately formed.

The substrate 670 is, for example, a printed circuit board and is fixed to the rear end frame 837. The substrate 670 is formed in a substantially circular shape, provided in a radially inner region of the motor 80, and the electronic components of two systems are mounted. In the present embodiment, of the two main surfaces of the substrate 670, one surface on the motor 80 side is referred to as a motor surface 671, and the other surface on the opposite side to the motor surface 671 is referred to as a cover surface 672.

FIG. 3 shows a circuit configuration of the driving device 1. The ECU 10 includes a first inverter 120, first motor relays 127 to 129, a first power supply relay 131, a first reverse connection protection relay 132, a first capacitor 134, and a first inductor 135, which are provided corresponding to the first motor winding 180. The ECU 10 further includes a second inverter 220, second motor relays 227 to 229, a second power supply relay 231, a second reverse connection protection relay 232, a second capacitor 234 and a second inductor 235, which are provided corresponding to the second motor winding 280. In the present embodiment, switching elements 121 to 126, 221 to 226 constituting the inverters 120, 220, motor relays 127 to 129, 227 to 229, relays 131, 132, 231, 232, capacitors 134, 234 and inductors 135, 235 are mounted on a single substrate 670.

Electric power is supplied to the first system from the first battery 199, and electric power is supplied to the second system from the second battery 299. The energization of the first motor winding 180 is controlled by the first microcomputer 175, and the energization of the second motor winding 280 is controlled by the second microcomputer 275. That is, in the present embodiment, the first system and the second system are provided independently and configured in a complete redundant configuration.

The first inverter 120 is a three-phase inverter, and includes upper arm elements (high-potential side elements) 121 to 123 and lower arm elements (low-potential side elements) 124 to 126, which are formed in a bridge circuit configuration. The upper arm elements 121 to 123 are connected to a high potential side. The lower arm elements 124 to 126 are connected to lower potential sides of the upper arm elements 121 to 123, respectively. A connection point between a pair of the upper arm element 121 and the lower arm element 124 of a U-phase is connected to one end of the first U-phase coil 181. A connection point between a pair of the upper arm element 122 and the lower arm element 125 of the V-phase is connected one end of the first V-phase coil 182. A connection point between a pair of the upper arm element 123 and the lower arm element 126 of the W-phase is connected to the other end of the first W-phase coil 183. The other ends of the coils 181 to 183 are connected to one another. On the low potential side of the lower arm elements 124 to 126, shunt resistors 137 to 139 which are current detection elements for detecting currents flowing in the coils 181 to 183 are provided, respectively.

The second inverter 220 is also a three-phase inverter, and includes upper arm elements 221 to 223 and lower arm elements 224 to 226, which are formed in a bridge circuit configuration. The upper arm elements 221 to 223 are connected to a high potential side. The lower arm elements 224 to 226 are connected to lower potential sides of the upper arm elements 221 to 223, respectively. A connection point between a pair of the upper arm element 221 and the lower arm element 224 of the U-phase is connected to one end of the second U-phase coil 281. A connection point between a pair of the upper arm element 222 and the lower arm element 225 of the V-phase is connected one end of the second V-phase coil 282. A connection point between a pair of the upper arm element 223 and the lower arm element 226 of the W-phase is connected to the other end of the second W-phase coil 283. The other ends of the coils 281 to 283 are connected to one another. On the low potential sides of the lower arm elements 224 to 226, shunt resistors 237 to 239 which are current detection elements for detecting currents flowing in the coils 281 to 283 are provided, respectively.

The first motor relays 127 to 129 are provided between the first inverter 120 and the first motor winding 180, and are provided to be able to connect and disconnect the first inverter 120 and the first motor winding 180. The motor relay 127 of the U-phase is provided between the connection point of the switching elements 121, 124 and the U-phase coil 181. The motor relay 128 of the V-phase is provided between the connection point of the switching elements 122, 125 and the V-phase coil 182. The motor relay 129 of the W-phase is provided between the connection point of the switching elements 123, 126 and the W-phase coil 183.

The second motor relays 227 to 229 are provided between the second inverter 220 and the second motor winding 280, and are provided to be able to connect and disconnect the second inverter 220 and the second motor winding 280. The motor relay 227 of the U-phase is provided between the connection point of the switching elements 221, 224 and the U-phase coil 281. The motor relay 228 of the V-phase is provided between the connection point of the switching elements 222, 225 and the V-phase coil 282. The motor relay 229 of the W-phase is provided between the connection point of the switching elements 223, 226 and the W-phase coil 283.

The first power supply relay 131 and the first reverse connection protection relay 132 are connected in series so that parasitic diodes thereof are in the opposite direction, and provided between the first battery 199 and the first inverter 120. The second power supply relay 231 and the second reverse connection protection relay 232 are connected in series so that parasitic diodes thereof are in the opposite direction, and provided between the second battery 299 and the second inverter 220. By connecting the parasitic diodes in the reverse direction, a reverse current is prevented from flowing when the batteries 199 and 299 are mistakenly connected in the reverse direction. Thus, the ECU 10 is protected. The upper arm elements 121 to 123, 221 to 223, the lower arm elements 124 to 126, 224 to 226, the motor relays 127 to 129, 227 to 229, the power supply relays 131, 231, and the reverse connection protection relays 132, 232 are simply referred to as switching elements below.

In the present embodiment, the upper arm elements 121 to 123, 221 to 223, the lower arm elements 124 to 126, 224 to 226, the motor relays 127 to 129, 227 to 229, the power supply relays 131, 231, and the reverse connection protection relays 132, 232 are all formed of MOSFETs. However, these MOSFETs may be replaced with IGBTs, thyristors or the like. The relays 131, 132, 231 and 232 may be mechanical relays.

The on/off operation of each switching elements 121 to 129, 131 and 132 is controlled by a first drive signal output from a first pre-driver based on a control signal of the first microcomputer 175. The on/off operation of each switching element 221 to 229, 231 and 232 is controlled by a second drive signal output from a second pre-driver based on a second control signal of the first microcomputer 275. The first pre-driver of the first system is included in a first integrated circuit 176, and the second pre-driver of the second system is included in a second integrated circuit 276. In the present embodiment, the microcomputers 175, 275 and the integrated circuits 176, 276 form a control circuit unit. It is noted that, in order to avoid complication, control wires to the motor relays and the power supply relays are not shown.

The first capacitor 134 is connected in parallel to the first inverter 120. The second capacitor 234 is connected in parallel to the second inverter 220. The capacitors 134 and 234 are, for example, aluminum electrolytic capacitors. The first inductor 135 is provided between the first battery 199 and the first power supply relay 131. The second inductor 235 is provided between the second battery 299 and the second power supply relay 231.

The first capacitor 134 and the first inductor 135, as well as the second capacitor 234 and the second inductor 235, which form filter circuits, reduce noise transmitted from other devices sharing the batteries 199 and 299, and noise transmitted from the driving device 1 to the other devices sharing the batteries 199 and 299. The capacitors 134 and 234 assist electric power supply to the inverters 120 and 220 by storing electric charge therein.

Figure 5:
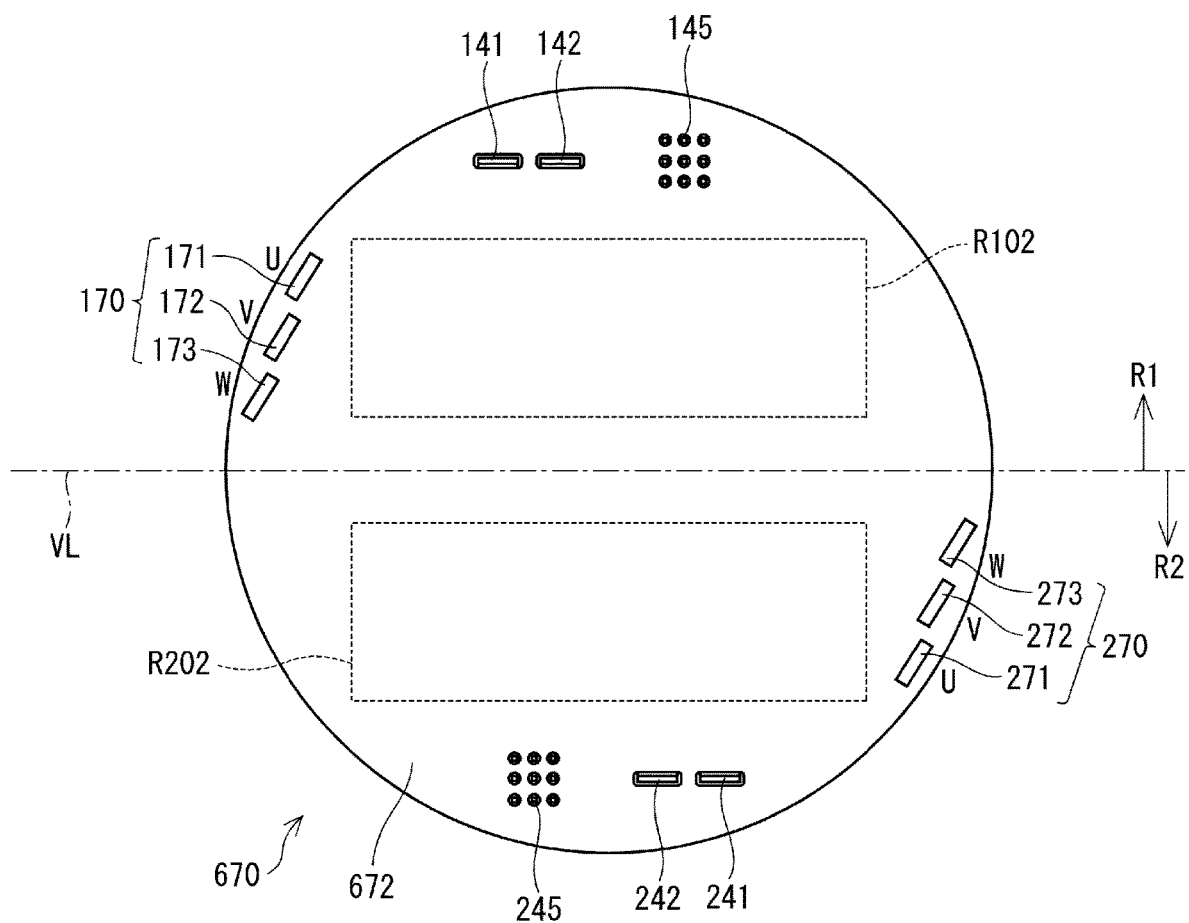
FIG. 5 is a plan view showing a cover surface side of the substrate in the first embodiment.

The motor surface 671 side and the cover surface 672 side of the substrate 670 is shown in FIG. 4 and FIG. 5, respectively. As shown in FIG. 4, on the motor surface 671, the switching elements 121 to 126, 221 to 226, the motor relays 127 to 129, 227 to 229, and the relays 131, 132, 231, 232 are mounted on the rear end frame 837 in a manner to be able to dissipate heat. The rotation angle sensor 675 is mounted substantially at the center of the motor surface 671 in a manner to face the magnet 875 (see FIG. 2).

In the present embodiment, it is assumed that the substrate 670 is divided into two regions as indicated by a virtual line VL. One of the regions is a first system region R1 and the other is a second system region R2. As shown in FIGS. 4 and 5, the upper side of the virtual line VL in each figures is the first system region R1, and the lower side in each figure is the second system region R2. The components related to the first system are mounted on the motor surface 671 and the cover surface 672 of the first system region R1. The components related to the second system are mounted on the motor surface 671 and the cover surface 672 of the second system region R2.

The switching elements 121 to 129, 131 and 132 are mounted in the first system region R1 and in the first power region R105 that fits in a quarter of the motor surface 671. The nine elements of the switching elements 121 to 129 are generally in the form of a 3 by 3 grid, and are arranged in the order of W-phase, V-phase and U-phase from the virtual line VL side.

Regarding the U-phase, the lead wire 171, the motor relay 127, the lower arm element 124, the upper arm element 121 and the reverse connection protection relay 132 are arranged on the same straight line in this order from the outer end side of the substrate 670 in parallel relation with the virtual line VL. The power supply relay 131 is located on the side of the power supply terminal 141 and the ground terminal 142 of the reverse connection protection relay 132. Regarding the V-phase, the lead wire 172, the motor relay 128, the lower arm element 125, the upper arm element 122 are arranged on the same straight line in this order from the outer end side of the substrate 670 in parallel relation with the virtual line VL. Regarding the W-phase, the lead wire 173, the motor relay 129, the lower arm element 126, the upper arm element 123 are arranged on the same straight line in this order from the outer end side of the substrate 670 in parallel relation with the virtual line VL.

The switching elements 221 to 229, 231 and 232 are mounted in the second system region R1 and in the second power region R205 that fits in a quarter of the motor surface 671. The nine elements of the switching elements 221 to 229 are generally in the form of a 3 by 3 grid, and are arranged in the order of W-phase, V-phase and U-phase from the virtual line VL side.

Regarding the U-phase, the lead wire 271, the motor relay 227, the lower arm element 224, the upper arm element 221 and the reverse connection protection relay 232 are arranged on the same straight line in this order from the outer end side of the substrate 670 in parallel relation with the virtual line VL. The power supply relay 231 is located on the side of the power supply terminal 241 and the ground terminal 142 of the reverse connection protection relay 132. Regarding the V-phase, the lead wire 272, the motor relay 228, the lower arm element 225, the upper arm element 222 are arranged on the same straight line in this order from the outer end side of the substrate 670 in parallel relation with the virtual line VL. Regarding the W-phase, the lead wire 273, the motor relay 229, the lower arm element 226, the upper arm element 223 are arranged on the same straight line in this order from the outer end side of the substrate 670 in parallel relation with the virtual line VL.

The capacitor 134, the inductor 135, the microcomputer 175 and the integrated circuit 176 such as an ASIC including the pre-driver are mounted in a first peripheral region R101, which is within the first system region R1 and outside the first power region R105 of the motor surface 671, and in the first peripheral region R102 of the cover surface 672.

The capacitor 234, the inductor 235, the microcomputer 275 and the integrated circuit 276 such as an ASIC including the pre-driver are mounted in a second peripheral region R201, which is within the second system region R2 and outside the second power region R205 of the motor surface 671, and in the second peripheral region R202 of the cover surface 672. Hereinafter, component parts mounted in the peripheral region will be referred to as peripheral components. The peripheral components include microcomputers 175 and 275 which are control circuit components.

The first power region R105 and the second power region R205 are located in rotational symmetry with respect to the rotation angle sensor 675, which is at the center of the substrate 670. In addition, corresponding elements of the switching elements 121 to 129, 131, 132 of the first system and corresponding elements of the switching elements 221 to 229, 231, 232 of the second system are arranged in rotational symmetry with respect to the rotation angle sensor 675. The arrangement of the above-described elements does not necessarily have to be strictly arranged in rotational symmetry.

Further, in the present embodiment, the MOSFET used as the switching element is down-sized, and the power regions R105 and R205 are equal to or less than a quarter of the motor surface 671 of the substrate 670. Therefore, power regions R105 and R205 and the peripheral regions R101 and 201 are alternately arranged in the circumferential direction. Specifically, the first power region R105, the first peripheral region R101, the second power region R205 and the second peripheral region R201 are arranged in the clockwise direction.

The power supply terminals 141, 241, the ground terminals 142, 242, and the control terminals 145, 245 are inserted from the cover surface 672 side into the insertion holes formed in the corresponding locations, and are electrically connected to the substrate 670. The terminals 141, 142, 241 and 242 are all elongated rectangular shapes in cross section, and are located in the outer peripheral region along the outer end of the substrate 670 such that the short side ends generally extend in the radial direction. In FIG. 4 and FIG. 5, in order to avoid complication, hatching etc. are not made but the location where each terminal and the lead wire sets 170, 270 are arranged are illustrated.

The power supply terminal 141, the ground terminal 142 and the control terminals 145 of the first system are located adjacently to each other. The power supply terminal 141 and the ground terminal 142 are located in the first power region R105 on the opposite side of the virtual line VL sandwiching the switching elements 121 to 129 therebetween. The control terminals 145 are located in the same one quarter region as the first peripheral region R101 and on the opposite side of the virtual line VL sandwiching the first peripheral region R101.

The power supply terminal 241, the ground terminal 242 and the control terminal 245 of the second system are arranged adjacently to each other. The power supply terminal 241 and the ground terminal 242 are located in the second power region R205 on the opposite side of the virtual line VL sandwiching the switching elements 221 to 229 therebetween. The control terminal 245 is located in the same one quarter region as the second peripheral region R201 and on the opposite side of the virtual line VL sandwiching the second peripheral region R201. Although the number of control terminals 145 and 245 is nine in each of FIG. 4 and FIG. 5, the number of such terminals is not limited to such numbers.

Figure 6:
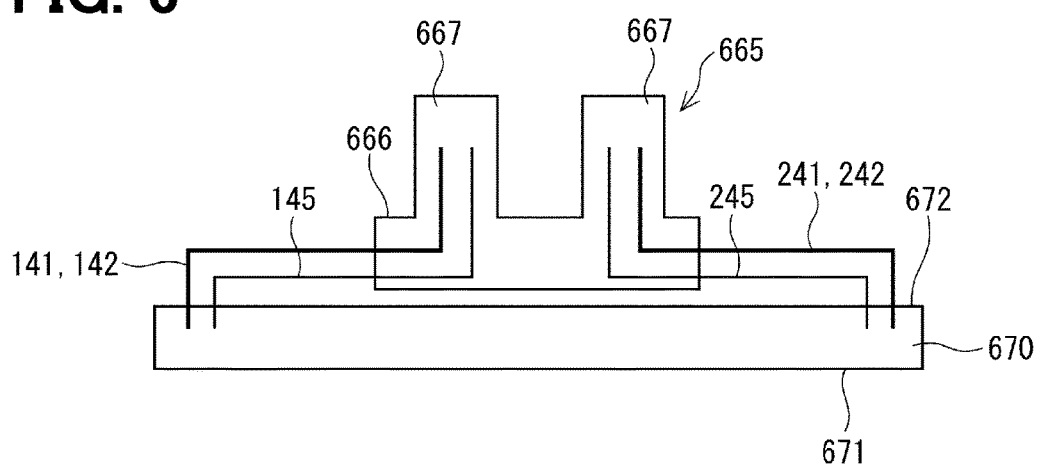
FIG. 6 is a schematic cross-sectional view showing a connector and the substrate in the first embodiment.
Figure 10:
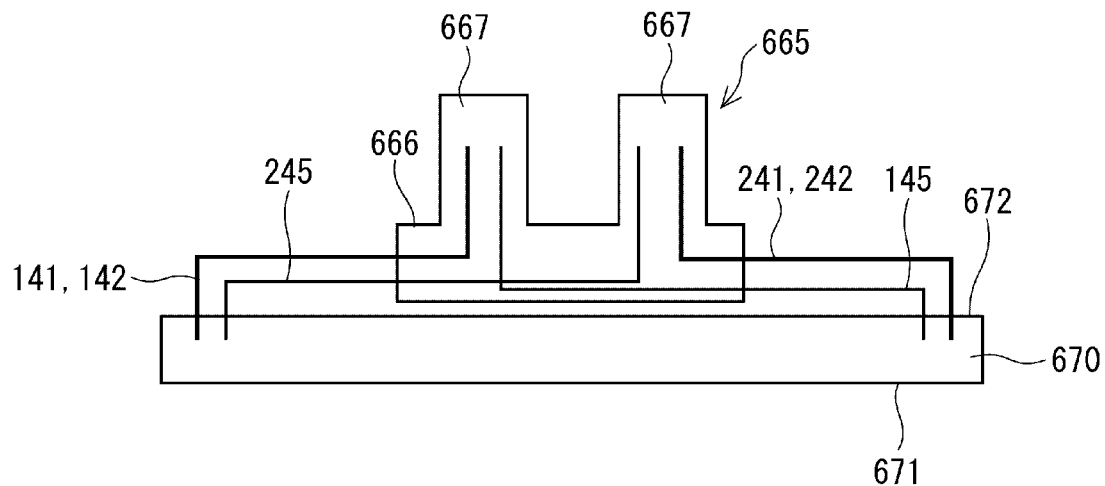
FIG. 10 is a schematic cross-sectional view showing the connector and the substrate in the second embodiment.
Figure 11:
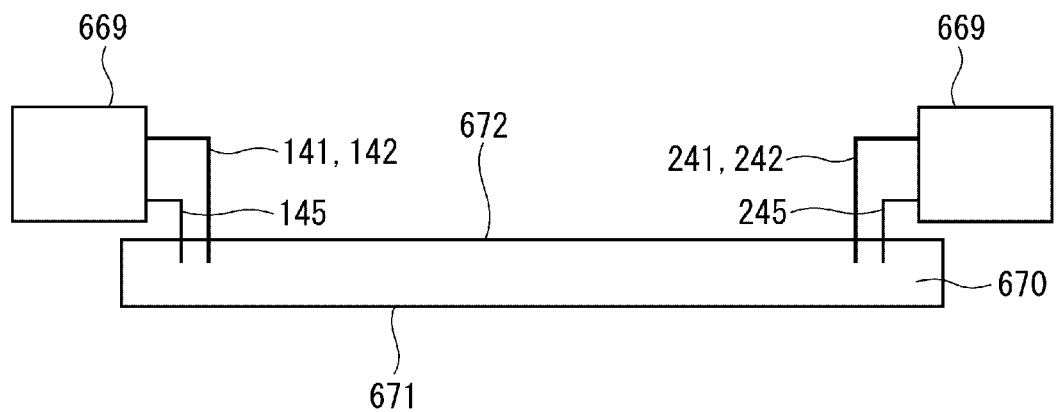
FIG. 11 is a schematic cross-sectional view showing the connector and the substrate in a third embodiment.
Figure 12:
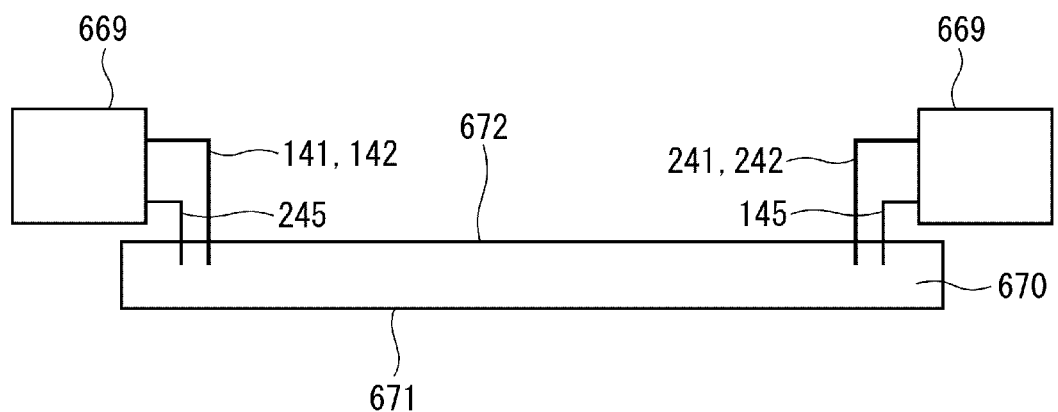
FIG. 12 is a schematic cross-sectional view showing the connector and the substrate in a fourth embodiment.

As shown in FIG. 6, the first power supply terminal 141, the first ground terminal 142 and the first control terminals 145 are provided in one connector portion 667. The second power supply terminal 241, the second ground terminal 242 and the second control terminals 245 are provided in the other connector portion 667. FIG. 6 is a schematic cross-sectional view, and hatching is not made to avoid complication. FIG. 10 to FIG. 12 are not hatched either.

As shown in FIG. 4, the lead wire sets 170 and 270 are inserted from the motor surface 671 side into the insertion holes formed in the corresponding portions, and are electrically connected to the substrate 670. The lead wire set 170 has the U-phase lead wire 171, the V-phase lead wire 172 and the W-phase lead wire 173, and is arranged in the first power region R105 opposite to the first peripheral region R101 sandwiching the switching elements 121 to 129. The lead wire set 270 has the U-phase lead wire 271, the V-phase lead wire 272 and the W-phase lead wire 273 and is arranged in the second power region R205 opposite to the second peripheral region R201 sandwiching the switching elements 221 to 229. The lead wires 171 to 173, 271 to 273 are all elongated rectangular shapes in cross section, and are located in the outer locations along the outer end of the substrate 670 such that the short side ends generally extend in the radial direction.

The first lead wire set 170 are arranged in the order of the W-phase, V-phase and U-phase from the virtual line VL side. The switching elements 121 to 129 are arranged in the order of the W-phase, V-phase and U-phase from the side of the virtual line VL similarly to the phase arrangement of the first lead wire set 170. The second lead wire set 270 are arranged in the order of the W-phase, V-phase and U-phase from the virtual wire VL side on the side opposite to the first lead wire set 170 with the rotation angle sensor 675 therebetween. The switching elements 221 to 229 are arranged in the order of the W-phase, V-phase and U-phase from the virtual line VL side, similarly to the phase arrangement of the second lead wire set 270.

Figure 22:
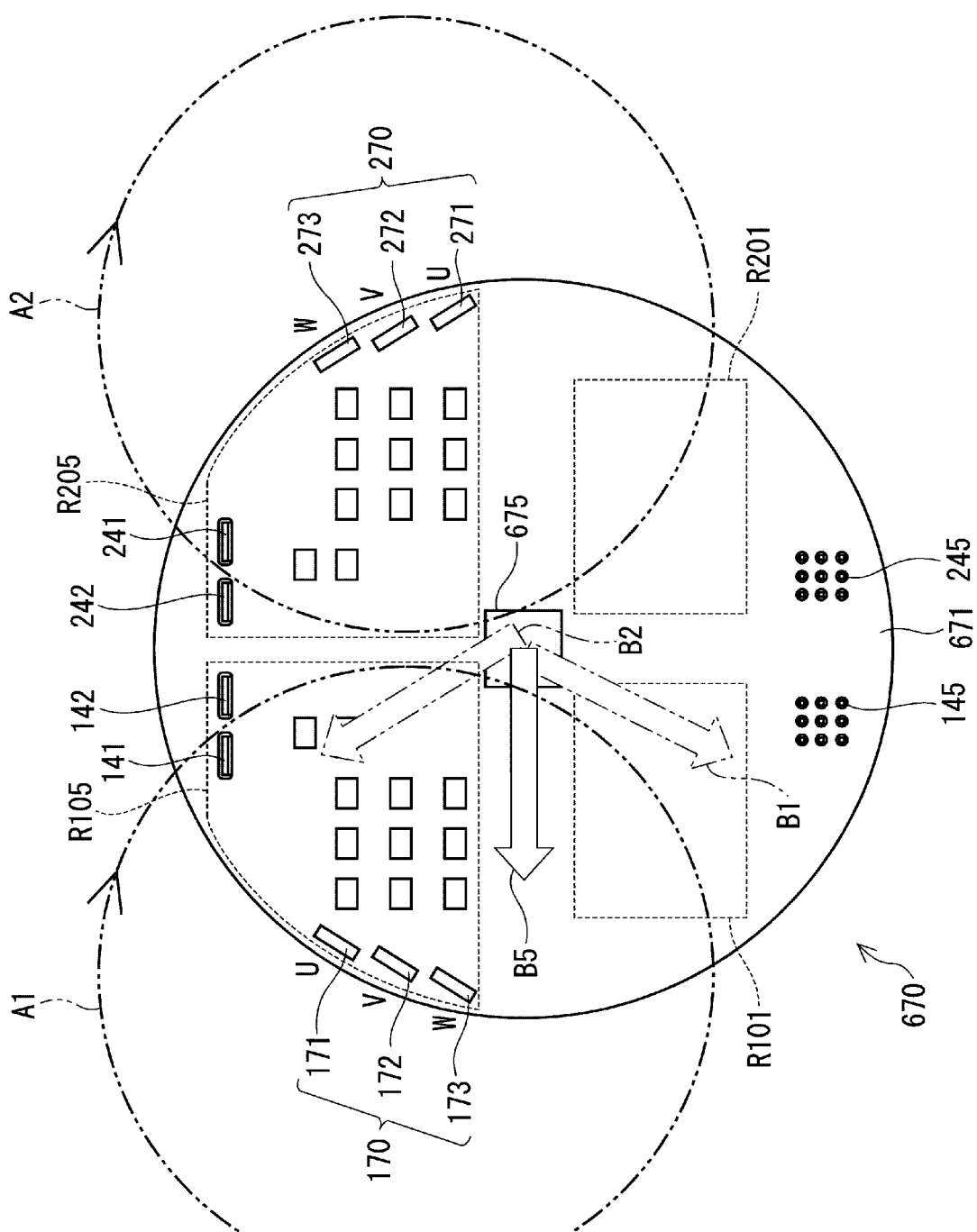
FIG. 22 is an explanatory view for explaining the magnetic field generated by energization of the lead wire set in a reference example.

In one exemplary arrangement shown as a reference example in FIG. 22, the first power region R105 and the second power region R205 are mirror-arranged side by side in a line symmetry. In this configuration, a magnetic field A1 is formed when a current flows from the front side to the back side of the drawing in the lead wire set 170, and a magnetic field A2 is formed when a current flows from the front side to the back side of the drawing in the lead wire set 270. Further, a magnetic field B1 applied to the rotation angle sensor 675 by energization of the first system and a magnetic field B2 applied to the rotation angle sensor 675 by energization of the second system are not canceled, and the magnetic field of a composite vector B5 of the magnetic fields B1 and B2 remains. As a result, there is a possibility that a detection error may occur in the rotation angle sensor 675.

Figure 7:
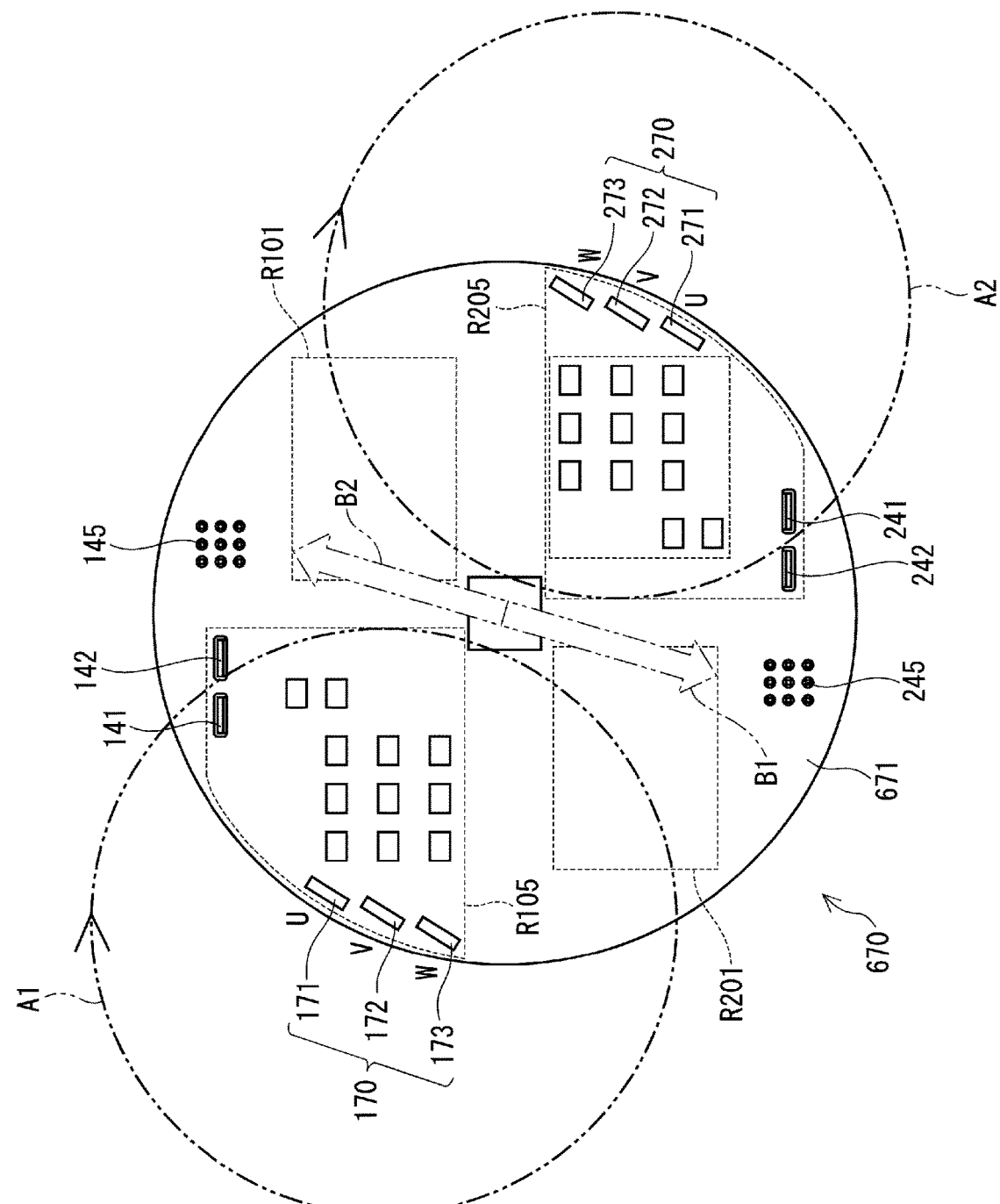
FIG. 7 is an explanatory view for explaining a magnetic field generated by energization of a lead wire set in the first embodiment.

Therefore, in the present embodiment, as shown in FIG. 4 and FIG. 7, the lead wires 171 to 173 and 271 to 273 of the corresponding phases are arranged point-symmetrically. Since the magnetic fields B1 and B2 related to the rotation angle sensor 675 are canceled by arranging the lead wire sets 170 and 270 in rotational symmetry with respect to the rotation angle sensor 675, the detection accuracy of the rotation angle sensor 675 can be secured. The lead wire sets 170 and 270 are allowed to have some deviation from the rotational symmetry. This deviation may result in some magnetic field remaining and causing a detection error of the rotation angle sensor 675. However, this deviation is negligible.

As described above, the driving device 1 according to the present embodiment includes the motor 80, the substrate 670, the rotation angle sensor 675, the switching elements 121 to 129, 131, 132, 221 to 229, 231, 232, and the lead wire sets 170, 270, power supply terminals 141, 241, ground terminals 142, 242, and the control circuit units.

The motor 80 is provided with the stator 840, the rotor 860 and the shaft 870. The stator 840 includes the motor windings of a plurality ("n") of systems. "n" is two (n=2) in the present embodiment but may be an integer more than two. The rotor 860 is provided rotatably relative to the stator 840. The shaft 870 is rotatable with the rotor 860. The substrate 670 is provided on one end side of the motor 80 in the axial direction. The rotation angle sensor 675 is mounted on the substrate 670 and detects the rotating magnetic field of the magnet 875, which rotates integrally with the shaft 870.

The switching elements 121 to 129, 131, 132, 221 to 229, 231 and 232 are mounted on the substrate 670, and switch energization of the motor windings 180 and 280. The lead wire sets 170 and 270 connect the coils 181 to 183 and 281 to 283 of the respective phases forming the motor windings 180 and 280 to the substrate 670. The power supply terminals 141 and 241 connect the substrate 670 and the batteries 199, 299. The ground terminals 142 and 242 connect the substrate 670 to the ground. The microcomputers 175, 275 and the integrated circuits 176, 276, which are control circuit units, are used to control the on/off operation of the switching elements.

The switching elements, the lead wire sets 170, 270, the power terminals which are the power supply terminals 141, 241 and the ground terminals 142, 242, and the control circuit unit are provided for each system. The switching elements 121 to 129, 131, 132, 221 to 229, 231, 232, the lead wire sets 170, 270 and the power terminals are collectively arranged in the power regions R105, R205 for each system, and the lead wire sets 170 are 270 are arranged in rotational symmetry.

As a result, the magnetic fields formed by the current flowing through the lead wire sets 170 and 270 of each system are cancelled, and the detection error of the rotation angle sensor 675 is reduced. By using the small-sized switching elements 121 to 129, 131, 132, 221 to 229, 231, 232 and arranging the lead wire sets 170 and 270 and the power terminals collectively in the power regions R105 and R205 for each system, a large number of peripheral regions used for mounting the control circuit unit are secured.

The motor windings 180 and 280 are provided for two systems. The motor surface 671 which is one surface of the substrate 670 on the motor 80 side is divided into a plurality of regions and arranged circumferentially in the order of the first power region R105 which is the power region of the first system, the first peripheral region R101 in which at least a part of the control circuit unit of the first system is mounted, the second power region R205 which is the power region of the second system, and the second peripheral region R201 in which at least a part of the control circuit unit of the second system is mounted. The switching elements of each system are arranged in rotational symmetry with the switching elements of the other systems. Thereby, the mounting region of the motor surface 671 of the substrate 670 is effectively used.

The driving device 1 further includes the control terminals 145 and 245 used for transmission and reception of signals between the control circuit unit and the external device or unit. Here, the external device or unit may be a vehicle communication network such as the torque sensor 94 or CAN (Controller region Network). The control terminals 145 and 245 are provided for each system and are located adjacent to the power terminals of the same system. Thereby, when forming the connector portion 667 provided with the power supply terminals 141, 241, the ground terminals 142, 242 and the control terminals 145, 245 for each system, the terminal length can be shortened.

The switching elements include upper arm elements 121 to 123, 221 to 223 forming the inverters 120, 220, and lower arm elements 124 to 126, 224 to 226 forming the inverters 120, 220 and connected to the low potential sides of the upper arm elements 121 to 123, 221 to 223, and the motor relays 127 to 129, 227 to 229 provided between the inverters 120, 220 and the motor windings 180, 280. The lead wire sets 170, 270, the motor relays 127 to 129, 227 to 229, the lower arm elements 124 to 126, 224 to 226, and upper arm elements 121 to 123, 221 to 223 are arranged in this order from the outer end side of the substrate 670. Thereby, a wiring pattern of the substrate 670 can be simplified.

The switching elements further include the power supply relay elements provided for each system between the power supply batteries and the inverters 120, 220. The power supply relay elements are arranged further inside the upper arm elements 121 to 123, 221 to 223. Thereby, a wiring pattern of the substrate 670 is simplified.

The electric power steering apparatus 8 includes the driving device 1 and the reduction gear 89. The reduction gear 89 transmits the driving force of the motor 80 to the steering shaft 92. The motor 80 outputs torque required for steering the vehicle. In the present embodiment, by arranging the lead wire sets 170 and 270 in rotational symmetry, it is possible to cancel the magnetic field generated by energization, so that the assist torque can be accurately controlled based on the detection value of the rotation angle sensor 675.

In the present embodiment, the motor 80 is a rotating electric machine, the magnet 875 is a detection target, the rotation angle sensor 675 is a magnetic detection element, and the coils 181 to 183 and 281 to 283 are phase windings, the batteries 199 and 299 are power supplies, and the power relays 131, 231 and the reverse connection protection relays 132, 232 are power relay elements.

Second Embodiment

Figure 8:
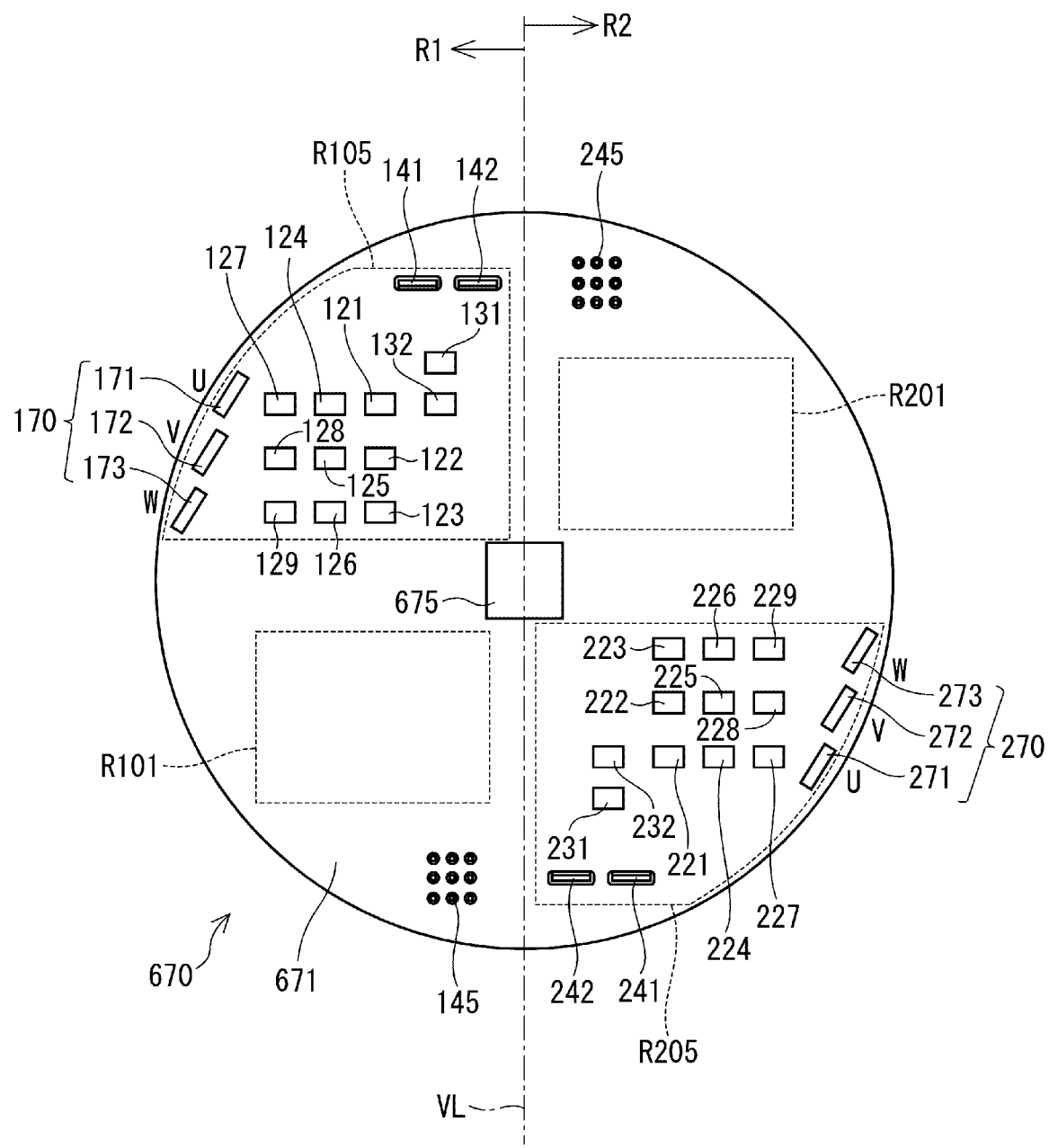
FIG. 8 is a plan view showing the motor surface side of the substrate in a second embodiment.
Figure 9:
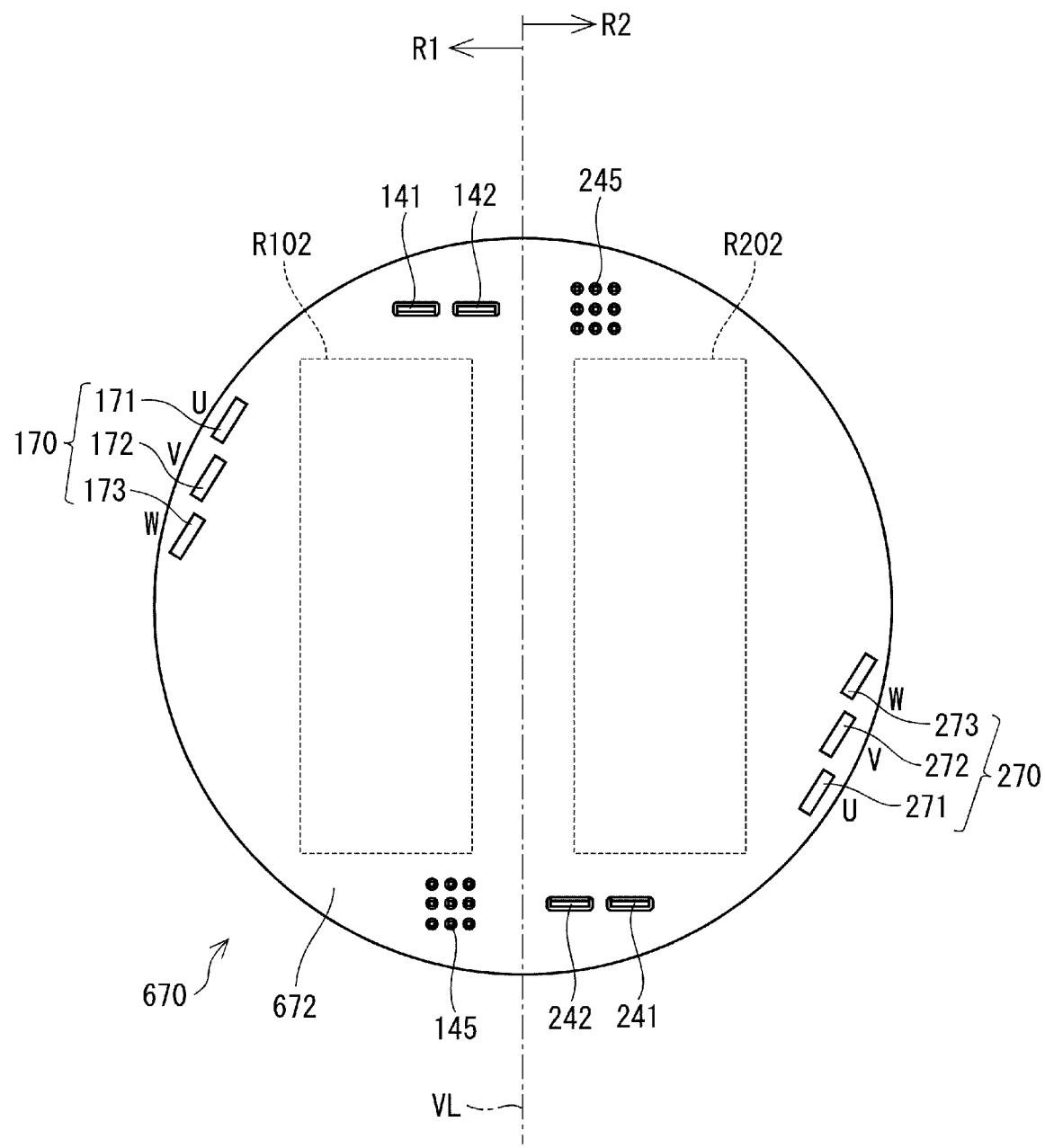
FIG. 9 is a plan view showing the cover surface side of the substrate in the second embodiment.

A second embodiment is shown in FIG. 8 to FIG. 10. As shown in FIG. 8, the first peripheral region R101 and the second peripheral region R201 are interchanged relative to the arrangement in the first embodiment. That is, the first power region R105, the first peripheral region R101, the second power region R205 and the second peripheral region R201 are arranged in this order in the counter-clock wise direction. As shown in FIGS. 8 and 9, in the present embodiment, the left side of the virtual line VL in each figure is the first system region R1 and the right side in each figure is the second system region R2.

In the present embodiment, the first power supply terminal 141 and the first ground terminal 142 are located adjacently to the second control terminals 245, and the second power supply terminal 241 and the second ground terminal 242 are located adjacently to the first control terminal 145. Therefore, as shown in FIG. 10, in case the connector portion 667 is provided for each system, the first control terminals 145 and the second control terminals 245 intersect inside the base portion 666 of the connector 665.

In the present embodiment, the control terminals 145 and 245 are located adjacently to the power terminals of the other system. The second embodiment also provides the similar effect as the first embodiment described above.

Third and Fourth Embodiments

A third embodiment and a fourth embodiment are shown in FIG. 11 and FIG. 12, respectively. In the embodiments described above, the connector portions 667 are provided at the axial end portion of the driving device 1. In the third and fourth embodiments, connector portions 669 are provided in the radially outward direction of the substrate 670. The opening of the connector portion 669 may be provided to open in the radially outward direction or may in the axial direction. In the third and fourth embodiments, two connector portions 669 are separately provided.

In the third embodiment, the arrangement of elements on the substrate 670 is the same as that of the first embodiment. As shown in FIG. 11, the first power supply terminal 141, the first ground terminal 142 and the first control terminals 145 are provided in one connector portion 669, and the second power supply terminal 241, the second ground terminal 242 and the second control terminals 245 are provided in the other connector portion 669.

The fourth embodiment is the same as the second embodiment in the element arrangement on the substrate 670. As shown in FIG. 12, the first power supply terminal 141, the first ground terminal 142 and the second control terminals 245 are provided in one connector portion 669, and the second power supply terminal 241, the second ground terminal 242 and the first control terminals 145 are provided in the other connector portion 669. The third and fourth embodiments also provide the similar effects as the embodiments described above.

Fifth Embodiment

Figure 13:
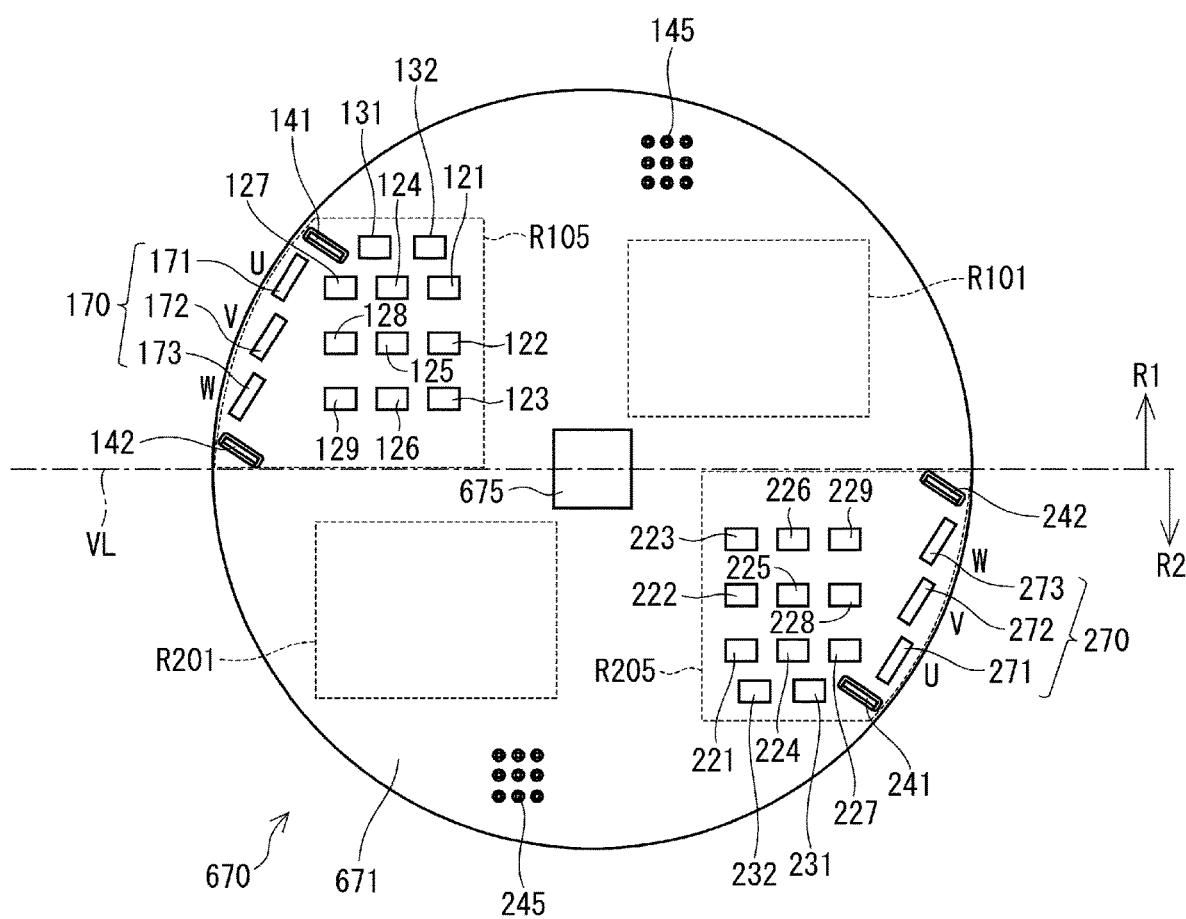
FIG. 13 is a plan view showing the motor surface side of the substrate in a fifth embodiment.
Figure 14:
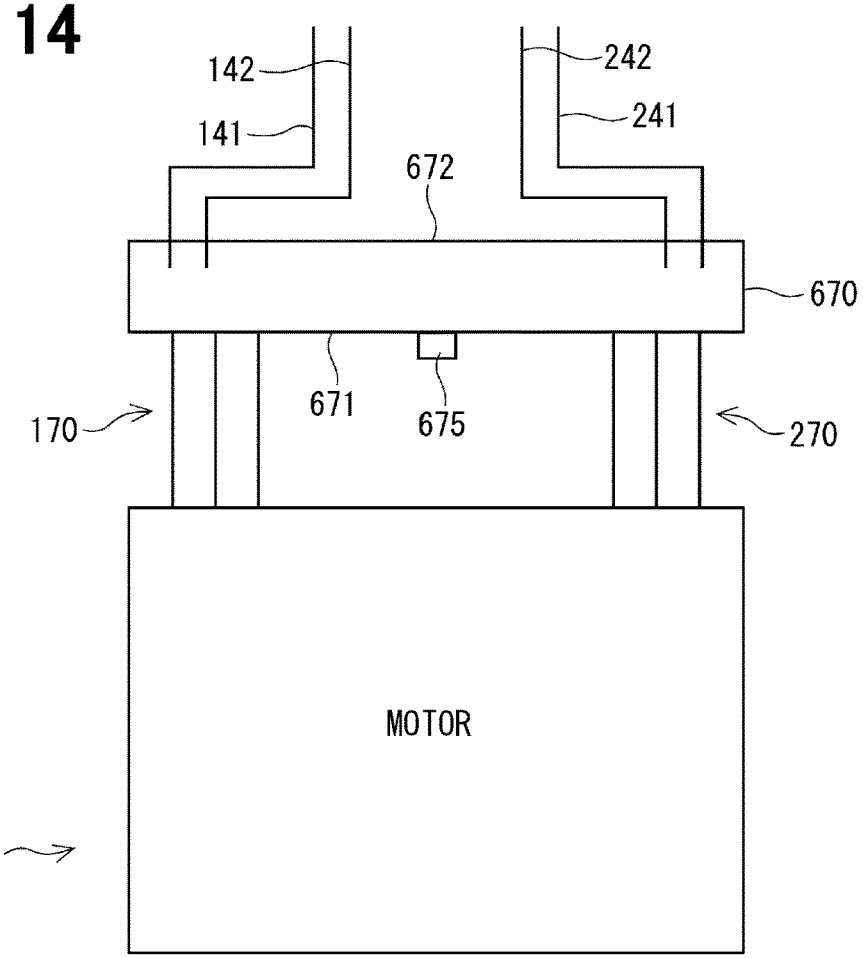
FIG. 14 is a schematic side view showing the lead wire set and power terminals in the fifth embodiment.
Figure 15:
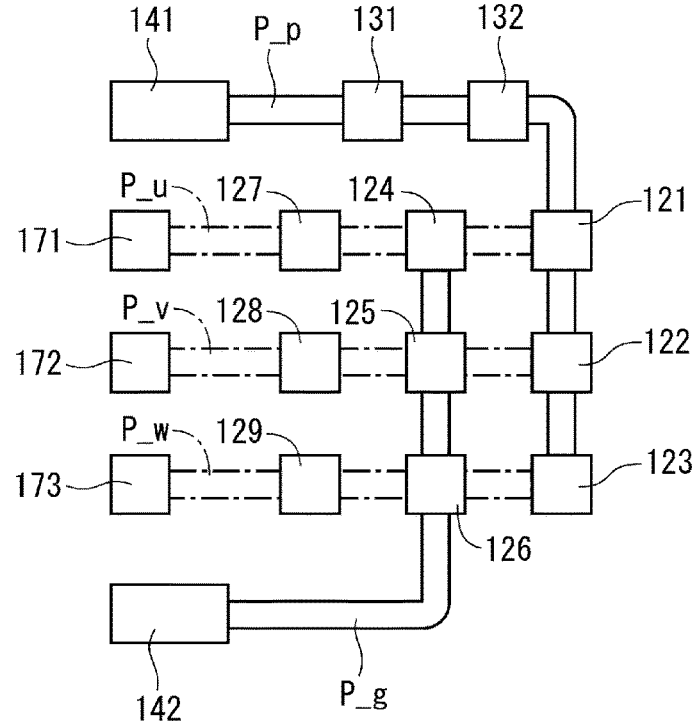
FIG. 15 is a schematic view illustrating a wiring pattern of the substrate in the fifth embodiment.

A fifth embodiment is shown in FIG. 13 to FIG. 15. In the embodiments described above, the first power supply terminal 141 and the first ground terminal 142 are located apart from the first lead wire set 170, and the second power supply terminal 241 and the second ground terminal 242 are located apart from the second lead wire set 270.

As shown in FIG. 13, as in the first embodiment, the first power region R105, the first peripheral region R101, the second power region R205 and the second peripheral region R201 are arranged in the clockwise direction. However, as in the second embodiment, these regions may be arranged in the counter-clockwise direction. These two arrangements applies to embodiments described later.

The first power supply terminal 141 and the first ground terminal 142 are located on both sides of the first lead wire set 170 in a manner sandwiching the first lead wire set 170. That is, the first lead wire set 170 is arranged between the first power supply terminal 141 and the first ground terminal 142. Similarly, the second power supply terminal 241 and the second ground terminal 242 are located on both sides of the second lead wire set 270 in a manner sandwiching the second lead wire set 170. That is, the second lead wire set 270 is located between the second power supply terminal 241 and the second ground terminal 242. Further, the second power supply terminal 241, the second ground terminal 242 and the lead wire set 270 are arranged opposite to the first power supply terminal 141, the first ground terminal 142 and the first lead wire set 170 in a manner sandwiching the rotation angle sensor 675 inbetween diagonally and in rotational symmetry.

The power supply terminals 141, 241 and the ground terminals 142, 242 are arranged with their ends of the long sides facing in the radial direction. The lead wires 171 to 173 and 271 to 273 are arranged with their ends of the short sides facing in the radial direction.

In the present embodiment, the first power supply terminal 141, the first ground terminal 142 and the first lead wire set 170 are collectively arranged together, and the second power supply terminal 241, the second ground terminal 242 and the second lead wire set 270 are collectively arranged together. Therefore, as shown in FIG. 14, when viewed from the side, the first lead wire set 170 is provided on the motor surface 671 side, and the first power supply terminal 141 and the first ground terminal 142 are provided on the cover surface 672 side at substantially the same location. When viewed from the side, the second lead wire set 270 is provided on the motor surface 671 side and the second power supply terminal 241 and the second ground terminal 242 are provided on the cover surface 672 side at substantially the same position.

As shown in FIG. 13 and FIG. 15, the first power supply relay 131 and the first reverse connection protection relay 132 are located adjacently to the first power supply terminal 141. Specifically, from the outer end side of the substrate 670, the first power supply terminal 141, the first power supply relay 131 and the first reverse connection protection relay 132 are arranged in this order. The second power supply relay 231 and the second reverse connection protection relay 232 are arranged adjacently to the second power supply terminal 241. Specifically, from the outer end side of the substrate 670, the second power supply terminal 241, the second power supply relay 231 and the second reverse connection protection relay 232 are arranged in this order.

In FIG. 15, arrangement of components of the first system on the substrate 670 is illustrated with a power wiring pattern indicated as P_p, a ground wiring pattern indicated as P_g, a U-phase wiring pattern indicated as P_u, a V-phase wiring pattern indicated as P_v, and a W-phase wiring pattern indicated as P_w. To show differences in the wiring patterns, the power wiring pattern P_p and the ground wiring pattern P_g are indicated by solid lines and the wiring patterns P_u, P_v and P_w of the respective phases are indicated by one-dot chain lines.

As shown in FIG. 15, the U-phase lead wire 171, the motor relay 127 and the switching elements 121, 124 are arranged on the same straight line. As a result, the U-phase wiring pattern P_u is formed in a simple shape such as a substantially straight shape. The V-phase wiring pattern P_v and the W-phase wiring pattern P_w are also formed in the simple shape.

The upper arm elements 121 to 123 are arranged on the same straight line and the power supply terminal 141, the power supply relay 131 and the reverse connection protection relay 132 are arranged on the same straight line. As a result, the power wiring pattern P_p, which connects the power supply terminal 141, the power supply relay 131, the reverse connection protection relay 132 and the switching elements 121 to 123 can be formed in a simple shape. In the example of FIG. 15, the power wiring pattern P_p is formed substantially in the L shape.

Further, since the lower arm elements 124 to 126 are arranged in the same straight line, the ground wiring pattern P_g connecting the switching elements 124 to 126 and the ground terminal 142 can be formed in a simple shape. In the example of FIG. 15, the ground wiring pattern P_g is formed substantially in the L shape. The second system is configured similarly to the first system described above.

In the present embodiment, the lead wire set 170 is located between the power supply terminal 141 and the ground terminal 142, and the lead wire set 270 is located between the power supply terminal 241 and the ground terminal 242. Since the power lines can thus be integrated collectively, the wiring pattern of the substrate 670 can be simplified. This configuration also provides the similar effect as the embodiments described above.

Sixth Embodiment

Figure 16:
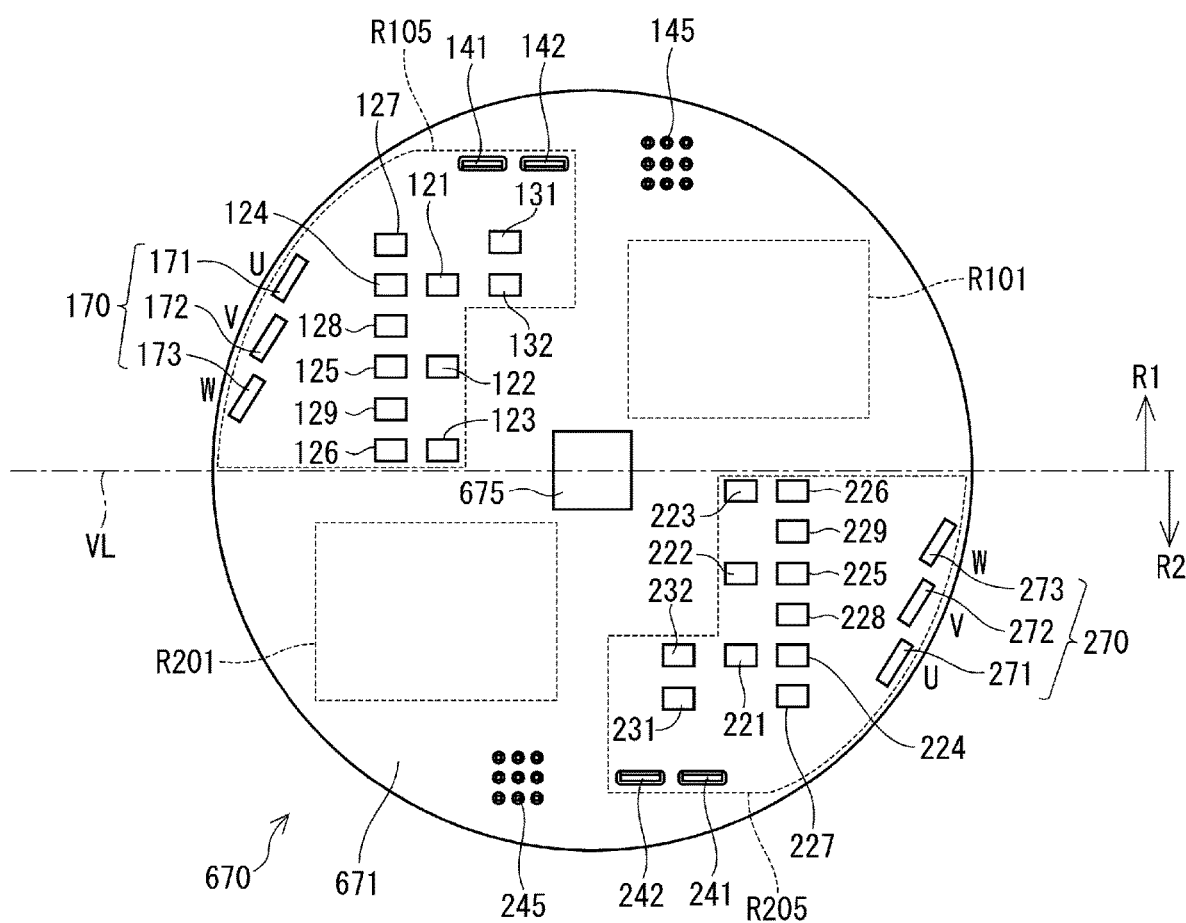
FIG. 16 is a plan view showing the motor surface side of the substrate in a sixth embodiment.

A sixth embodiment is shown in FIG. 16. In FIG. 16, the power supply terminal, the ground terminal and the lead wires are arranged in the same manner as in the first embodiment, but may be arranged as in the fifth embodiment. This also applies to the following embodiments.

In the present embodiment, the arrangement of the switching elements 121 to 129 and 221 to 229 is different from that of the above embodiments. In the U-phase, the upper arm element 121 and the lower arm element 124 are located side by side, and the motor relay 127 is located at one side of the lower arm element 124 opposite to the V-phase. In the V-phase, the upper arm element 122 and the lower arm element 125 are located side by side, and the motor relay 128 is located at the U phase side of the lower arm element 125. In the W-phase, the upper arm element 123 and the lower arm element 126 are located side by side, and the motor relay 129 is located at the V phase side of the lower arm element 126.

As a whole, the lead wire set 170, the lower arm elements 124 to 126, the motor relays 127 to 129, the upper arm elements 121 to 123, the power supply relay 131 and the reverse connection protection relay 132 are arranged in this order from the outer end side of the substrate 670. The lower arm elements 124 to 126 and the motor relays 127 to 129 are alternately arranged. The second system is also arranged in the similar manner as the first system. This configuration also provides the similar effect as the embodiments described above.

Seventh Embodiment

Figure 17:
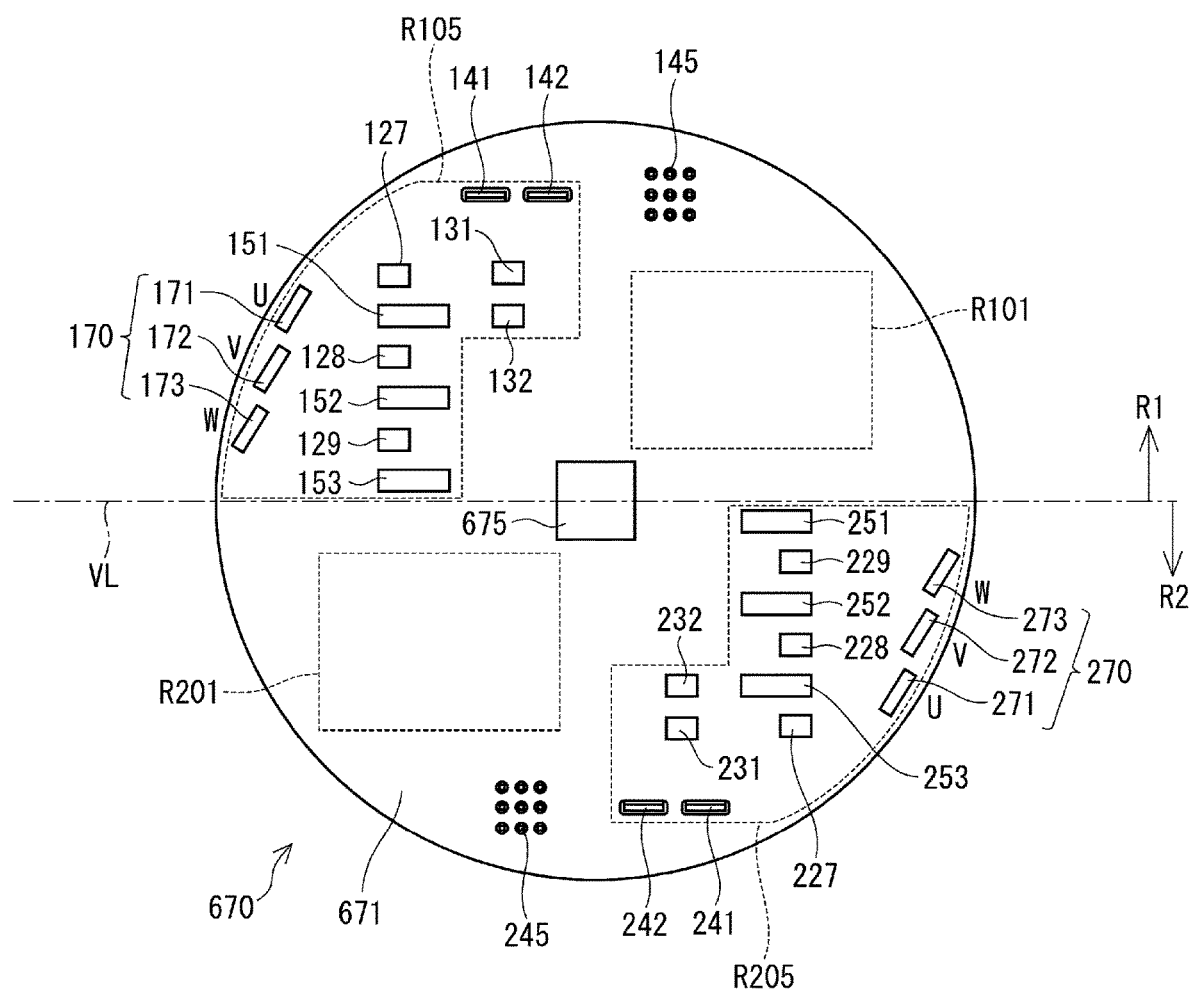
FIG. 17 is a plan view showing the motor surface side of the substrate in a seventh embodiment.

A seventh embodiment is shown in FIG. 17. The seventh embodiment is a modification of the sixth embodiment, and two switching elements forming the upper and lower arms are in one package. That is, the upper arm element 121 and the lower arm element 124 of the U-phase of the first system are provided in one package 151, the upper arm element 122 and the lower arm element 125 of the V-phase are provided in one package 152, and the upper arm element 123 and the lower arm element 126 of the W phase are provided in one package 153. Further, the upper arm element 221 and the lower arm element 224 of the U-phase of the second system are provided in one package 251, and the upper arm element 222 and the lower arm element 225 of the V-phase are provided in one package 252, and the upper arm element 223 and the lower arm element 226 of the W phase of the second system are provided in one package 253.

Further, the motor relays 127 to 129 and packages 151 to 153 are alternately arranged in the first power region R105, and motor relays 227 to 229 and the packages 251 to 253 are alternately arranged in the second power region R205. The packages 151 to 152 and 251 to 253 may be used instead of the switching elements 121 to 126 and 221 to 226 in the above embodiment. This configuration also provides the similar effect as the embodiments described above.

Eighth Embodiment

Figure 18:
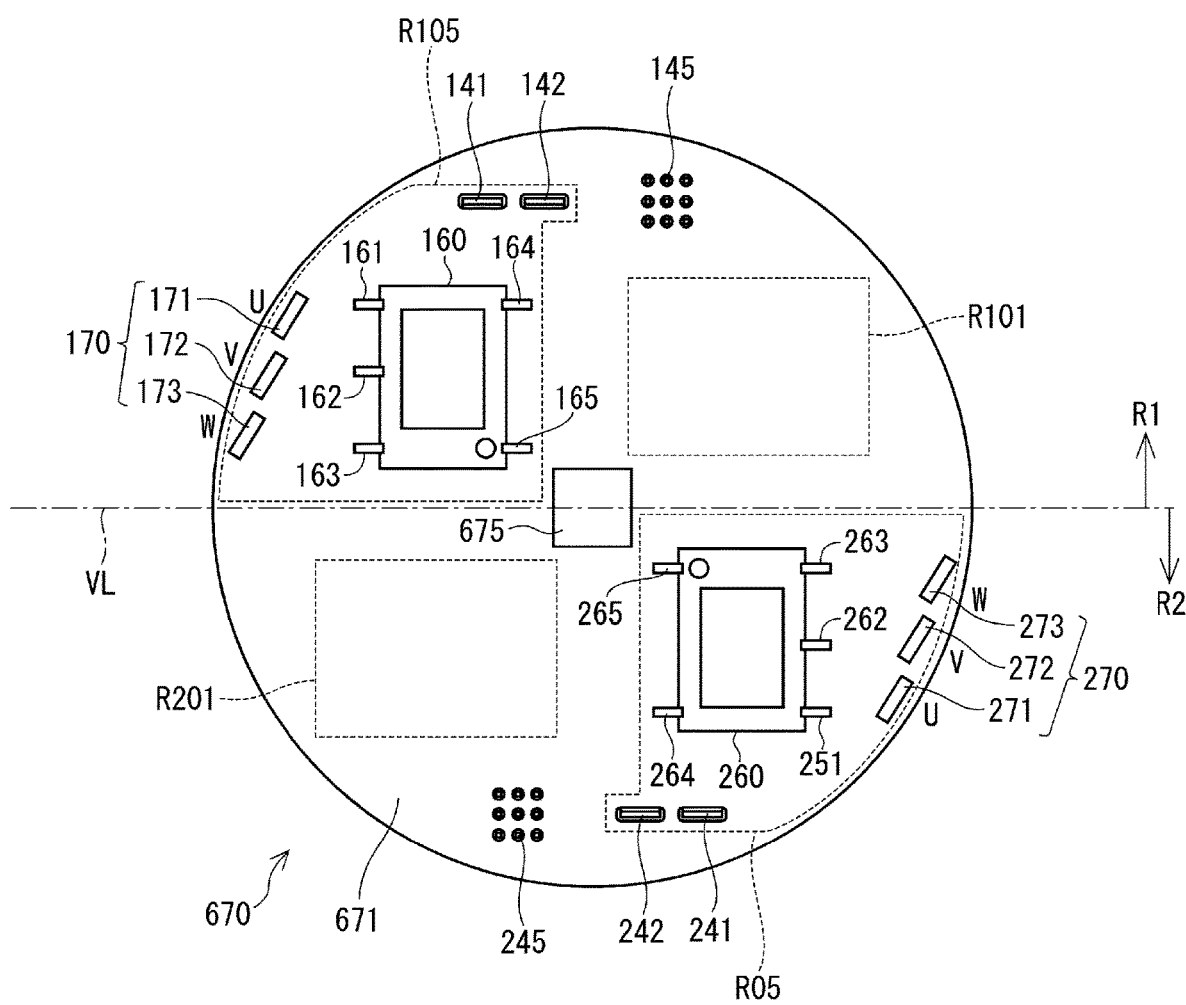
FIG. 18 is a plan view showing the motor surface side of the substrate in an eighth embodiment.

An eighth embodiment is shown in FIG. 18. In the present embodiment, the upper arm elements 121 to 123, the lower arm elements 124 to 126, the motor relays 127 to 129, the power supply relay 131 and the reverse connection protection relay 132 of the first system are provided in one first module 160. Further, the upper arm elements 221 to 223, the lower arm elements 224 to 226, the motor relays 227 to 229, the power supply relay 231 and the reverse connection protection relay 232 of the second system are provided in one second module 260. The first module 160 and the second module 260 are similarly configured and arranged point-symmetrically.

The first module 160 is formed in a substantially rectangular shape in plan view. The U-phase motor connection terminal 161, the V-phase motor connection terminal 162 and the W-phase motor connection terminal 163 are formed on one side in the longitudinal direction, and the power supply connection terminal 164 and the ground connection terminal 165 are formed on the other side. The first module 160 is mounted so that the side on which the motor connection terminals 161 to 163 are formed faces the lead wire set 170.

The second module 260 is formed in a substantially rectangular shape in plan view. The U-phase motor connection terminal 261, the V-phase motor connection terminal 262 and the W-phase motor connection terminal 263 are formed on one side in the longitudinal direction, and the power supply connection terminal 264 and the ground connection terminal 265 are formed on the other side. The second module 260 is mounted so that the side on which the motor connection terminals 261 to 263 are formed faces the lead wire set 270. The modules 160 and 260 may be used instead of the switching elements 121 to 126 and 221 to 226 in the above embodiment. This configuration also provides the similar effect as the embodiments described above.

Tenth Embodiment

Figure 19:
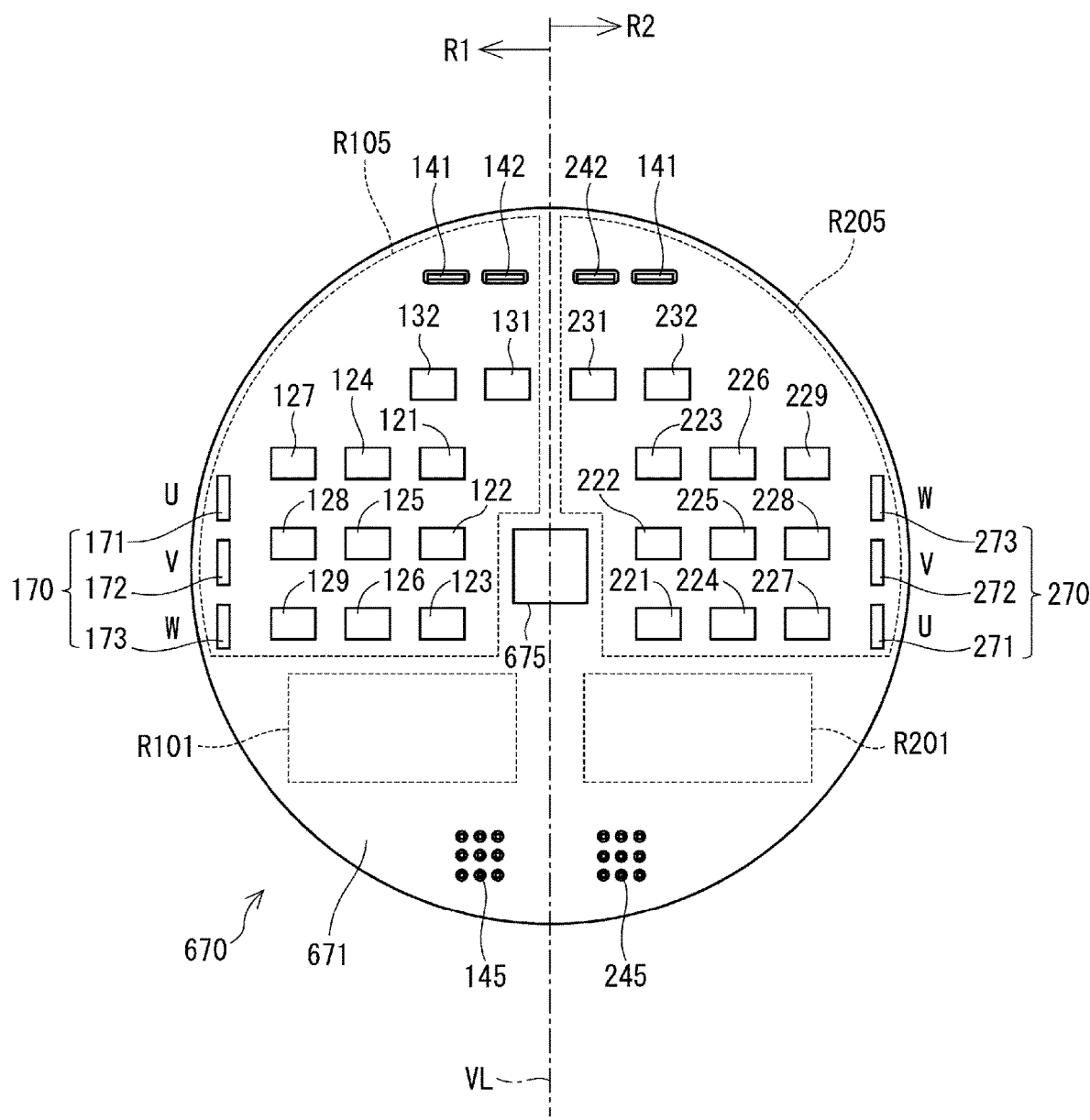
FIG. 19 is a plan view showing the motor surface side of the substrate in a ninth embodiment.

A tenth embodiment is shown in FIG. 19. As shown in FIG. 19, in case that there is a margin in the substrate surface area, the switching elements of each system may be arranged in line symmetry with the switching elements of the other system. In the present embodiment, the switching elements 121 to 129, 131 and 132 of the first system and the switching elements 221 to 229, 231 and 232 of the second system are arranged in line symmetry with respect to the virtual line VL.

It is preferable from the viewpoint of formation of the wiring pattern or the like that the lead wire sets 170 and 270 are arranged point-symmetrically and line-symmetrically, and the phase arrangement of the switching elements is in the order according to the arrangement order of the lead wires 170 and 270.

In addition, the set of the power supply terminal 141 and the ground terminal 142 and the set of the power supply terminals 241 and the ground terminals 242, all of which are power terminals, are arranged in line symmetry. The components included in the first power region R105 and the second power region R205 are arranged in line symmetry. Furthermore, the peripheral regions R101 and R202 as well as the control terminals 145 and 245 are also arranged in line symmetry.

In the present embodiment, the power terminals of the first system and the second system are arranged adjacent to each other, and the control terminals 145 and 245 are provided on the opposite side to the power terminals while sandwiching the power regions R105, R205 and the peripheral regions R101, R201 therebetween. Thus, in case the power connector and the control connector are provided separately, the wiring can be easily managed. Of course, as in the above embodiments, the connector unit may be provided for each system. Thereby, the same effect as the above embodiment can be provided.

Tenth and Eleventh Embodiments

Figure 20:
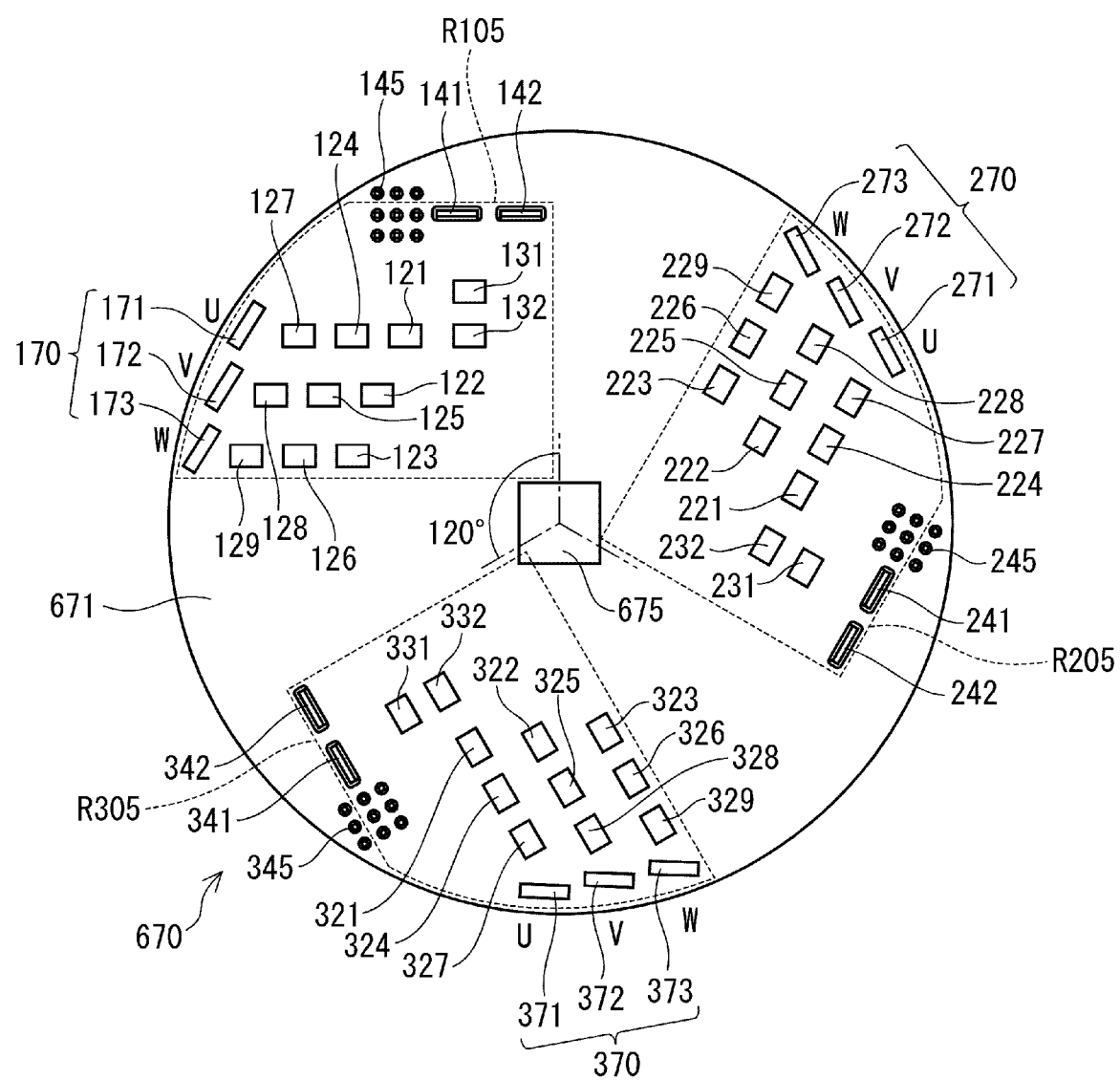
FIG. 20 is a plan view showing the motor surface side of the substrate in a tenth embodiment.
Figure 21:
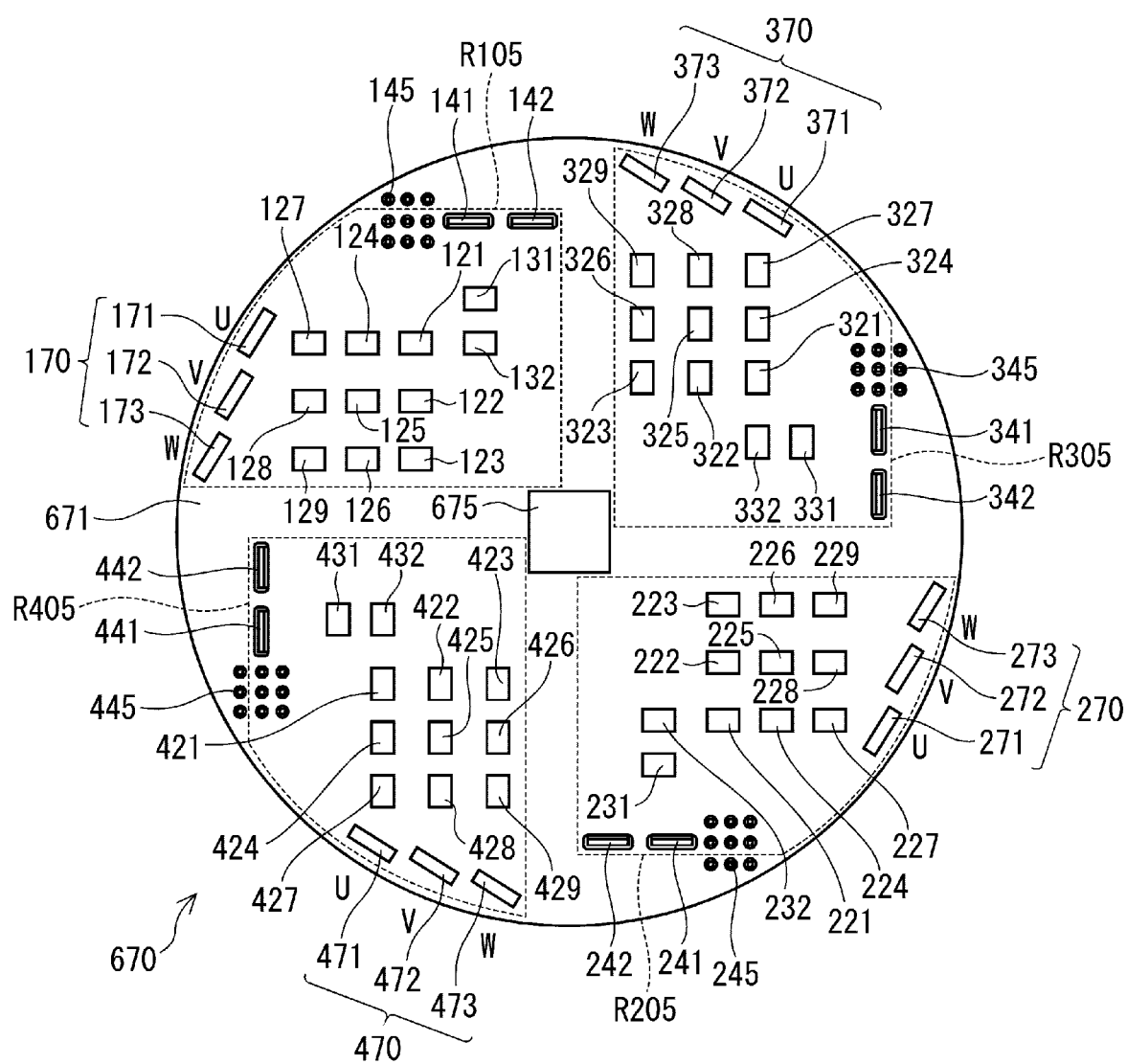
FIG. 21 is a plan view showing the motor surface side of the substrate in an eleventh embodiment.

A tenth embodiment and an eleventh embodiment are shown in FIG. 20 and FIG. 21, respectively. In the tenth embodiment, three sets of motor windings and three sets of inverters and the like are provided to form three systems. In the eleventh embodiment, four sets of motor windings and four sets of inverters and the like are provided to form four systems. Hereinafter, in addition to the first system and the second system described in the embodiments described above, the configuration related to the third system is identified by reference numerals of 300s, and the configuration related to the fourth system is identified by reference numerals of 400s. The same reference numerals are assigned to the substantially same configurations so that the lower two digits are the same so that the description will be simplified.

As shown in FIG. 20, in case of three inverters, the lead wire sets 170, 270 and 370 are arranged so as to be rotationally symmetrical at 120°. Similarly, the upper arm elements 121 to 123, the lower arm elements 124 to 126, the motor relays 127 to 129, the power supply relay 131 and the reverse connection protection relay 132 of the first system, the upper arm elements 221 to 223, the lower arm elements 224 to 226, the motor relays 227 to 229, the power supply relay 231 and the reverse connection protection relay 232 of the second system, and the upper arm elements 321 to 323, the lower arm elements 324 to 326, the motor relays 327 to 329, the power supply relay 331 and the reverse connection protection relay 332 of the third system are arranged to be rotationally symmetrical at 120°.

As shown in FIG. 21, in case of four inverters, the lead wire sets 170, 270, 370 and 470 are arranged so as to be rotationally symmetrical at 90°. Similarly, the upper arm elements 121 to 123, the lower arm elements 124 to 126, the motor relays 127 to 129, the power supply relay 131 and the reverse connection protection relay 132 of the first system, the upper arm elements 221 to 223, the lower arm elements 224 to 226, the motor relays 227 to 229, the power supply relay 231 and the reverse connection protection relay 232 of the second system, the upper arm elements 321 to 323, the lower arm elements 324 to 326, the motor relays 327 to 329, the power supply relay 331 and the reverse connection protection relay 332 of the third system, and upper arm elements 421 to 423, lower arm elements 424 to 426, motor relays 427 to 429, a power supply relay 431 and a reverse connection protection relay 432 of the fourth system are arranged to be rotationally symmetrical by 90°.

In general, in case of "n" systems of inverters and motor windings, each component is arranged to be rotationally symmetric at an angle of 360°/n. That is, the power elements for one system are collectively arranged in a divided area where the substrate 670 is divided by the number of systems and arranged to be rotationally symmetric to the other areas. As far as all the systems are normal, all the systems are used to drive the motor 80. In case that the number of systems "n" is an even number, driving of the motor 80 may be performed using a part of systems which are rotationally symmetrical with respect to the rotation angle sensor 675. Thereby, even in case of three or more systems, the detection error of the rotation angle sensor can be reduced. When an abnormality occurs in some of the systems, the motor 80 is continuously driven without using the system in which the abnormality has occurred. This configuration also provides the similar effect as the embodiments described above.

In FIG. 20 and FIG. 21, the power supply terminals, the ground terminals and the control terminals are collectively arranged system by system. Moreover, in FIG. 20 and FIG. 21, the power regions R105, R205, R305 and R405 are illustrated, and the peripheral regions are not illustrated. Depending on the space of the substrate 670, a part of the control components may be mounted on the motor surface 671 or all of the control components may be mounted on the cover surface 672. As shown in FIG. 20, the switching elements 121 to 123, which are the upper arm elements, may be diagonally displaced. The same applies to the switching elements 124 to 126 which are the lower arm elements, the motor relays 127 to 129 and the other systems. The same applies to each embodiment of the two systems and the tenth embodiment of the four systems. Further, also in the ninth embodiment of the three systems, the upper arm elements, the lower arm elements and the motor relay may be arranged without being obliquely shifted as in the first embodiment and the like.

OTHER EMBODIMENTS

In the above embodiment, the number of systems is two to four. As another other embodiment, the number of systems may be five or more. In the above embodiments, the connector is provided for each system. As another embodiment, the number of connectors and the number of systems included in one connector may be arbitrary, for example, one connector may be shared by a plurality of systems. Further, the power connector provided with the power terminal and the control connector provided with the control terminals may be provided separately.

In the above embodiment, the switching elements includes the upper arm elements, the lower arm elements, the motor relay, the power supply relay and the reverse connection protection relay. As another embodiment, some of these elements forming the switching elements may be omitted.

In the above embodiments, the rotary electric machine is a three-phase brushless motor. As another embodiment, the rotary electric machine is not limited to the three-phase brushless motor, and any motor may be used. Further, the rotary electric machine may also be a generator, or may be a motor-generator having both of a motor function and a generator function.

In the above embodiments, the electronic control unit is applied to the electric power steering apparatus. As another embodiment, the electronic control unit may be applied to other apparatuses different from the electric power steering apparatus. The present disclosure is not limited to the above embodiments, and various modifications may be implemented without departing from the spirit of the present disclosure.

What is claimed is:

1. A driving device comprising:
   a rotary electric machine including a stator on which motor windings of "n" systems ("n" is integer equal to or larger than 2), a rotor provided rotatably relative to the stator, and a shaft rotatable with the rotor;
   a substrate provided on one end side in an axial direction of the rotary electrical machine;
   a magnetic detection element mounted on the substrate for detecting a rotating magnetic field of a detection target which rotates integrally with the shaft;
   switching elements mounted on the substrate for switching energization of the motor windings;
   a lead wire set connecting the substrate and each phase winding of the motor windings;
   a power supply terminal connecting the substrate and a power supply;
   a ground terminal connecting the substrate and a ground; and
   a control circuit unit used to control on-off operations of the switching elements, wherein:
   the switching elements, the lead wire set, a power terminal including the power supply terminal and the ground terminal, and the control circuit unit are provided for each system;
   the switching elements, the lead wire set and the power terminal are arranged collectively in a power region provided for each system; and
   the lead wire sets are arranged in rotational symmetry.

2. The driving device according to claim 1, wherein:
   the motor windings are provided for a first system and a second system; and
   the substrate has a surface on a rotary electric machine side, on which a first power region as the power region of the first system, a first peripheral region on which at least a part of the control circuit unit of the first system is mounted, a second power region as the power region of the second system, and a second peripheral region on which at least a part of the control circuit unit of the second system is mounted are arranged in a circumferential direction.

3. The driving device according to claim 1, further comprising:
   control terminals provided to transmit and receive signals between the control circuit unit and an external side,
   wherein the control terminals are provided for each system and arranged adjacent to the power terminal of a same system.

4. The driving device according to claim 1, further comprising:
   control terminals provided to transmit and receive signals between the control circuit unit and an external side,
   wherein the control terminals are provided for each system and arranged adjacent to the power terminal of an other system different from a same system.

5. The driving device according to claim 1, wherein:
   the lead wire set is provided between the power supply terminal and the ground terminal.

6. The driving device according to claim 1, wherein:
the switching elements include upper arm elements of an inverter and lower arm elements of the inverter connected to low potential sides of the upper arm elements, and a motor relay provided between the inverter and the motor windings; and
the lead wire set, the motor relay, the lower arm elements, the upper arm elements of each system are arranged from an outer peripheral side of the substrate in this order.

7. The driving device according to claim 6, wherein:
the switching elements includes a power supply relay element provided between the power supply and the inverter in each system; and
the power supply relay element is arranged inside the upper arm elements.

8. The driving device according to claim 1, wherein:
the switching elements of each system is arranged in rotational symmetry with the switching elements of an other system.

9. The driving device according to claim 1, wherein:
the switching elements of each system are arranged in line symmetry with the switching elements of an other system.

10. An electric power steering system comprising:
the driving device according to claim 1; and
a power transmission device for transmitting driving power of the rotary electric machine to a driven target,
wherein the rotary electric machine outputs torque required for steering of a vehicle.

* * * * *